United States Patent [19]

Kaverhad et al.

[11] Patent Number: 5,179,605
[45] Date of Patent: Jan. 12, 1993

[54] OPTICAL INTERCONNECTION DEVICE
[75] Inventors: Mohsen Kaverhad, Ontario, Canada; Mahmoud Tabiani, Tehran, Iran
[73] Assignee: University of Ottawa, Ottawa, Canada
[21] Appl. No.: 594,137
[22] Filed: Oct. 10, 1990

Related U.S. Application Data

[63] Continuation-in-part of PCT/CA 90/00119, Apr. 11, 1990
[51] Int. Cl.[5] .............................................. G02B 6/34
[52] U.S. Cl. ..................................................... 385/37
[58] Field of Search ........................ 385/10, 37, 39, 46; 370/3

[56] References Cited

U.S. PATENT DOCUMENTS

| 3,580,655 | 5/1971 | Leith et al. | 350/3.5 |
|---|---|---|---|
| 4,057,319 | 11/1977 | Ash et al. | 350/96 |
| 4,705,344 | 11/1987 | Hinton et al. | 350/3.73 |
| 4,838,630 | 6/1989 | Jannson et al. | 350/3.7 |
| 4,877,297 | 10/1989 | Yeh | 350/3.68 |
| 4,914,648 | 4/1990 | Acampora | 370/3 |

FOREIGN PATENT DOCUMENTS

| 0284293 | 9/1988 | European Pat. Off. . |
|---|---|---|
| 0339657 | 4/1989 | European Pat. Off. . |
| 0340987 | 4/1989 | European Pat. Off. . |

OTHER PUBLICATIONS

Yeh et al., "Optical Interconnection Using Photorefractive Dynamic Holograms", Applied Optics, vol. 27, No. 11, 1 Jun. 1988.
"Multihop Lightwave Networks: A New Approach To Achieve Terabit Capabilities" by Anthony S. Acampori and Mark J. Karol and Michael G. Hluchyj, 46.1.1–46.1.7 1988 IEEE.
"*Bragg Gratings on INGAASP/INP Waveguides as Polarization Independent Optical Filters*" by C. Cremer, G. Heise, R. März, M. Schienle, G. Schulte-Roth and H. Unzeitig, Journal of Lightwave Technology, vol. 7, No. 11, Nov. 1989.
"*Two-Wave Mixing in Nonlinear Media*" by Pochi Yeh, IEEE Journal of Quantum Electronics, vol. 25, No. 3 Mar. 1989.
"*Spatio Temporal Optical Signal Processing*" by Mahmoud Tabiani, A PhD thesis M.I.T. Aug. 1979.

Primary Examiner—Léon Scott, Jr.
Attorney, Agent, or Firm—Thomas Adams

[57] ABSTRACT

An optical interconnection device suitable for an $N \times N'$ coupler as used, for example, in a local area network, comprises diffraction means in the form of a body having a refractive index which varies spatially and periodically in one plane of the body. The arrangement is such that light incident upon the body in the plane and at a predetermined angle will be refracted to emerge at a plurality of discrete angles determined by the spatially varying refractive index. The incident light is distributed substantially equally among the plurality of output refracted beams and substantially all of said incident light is coupled to the plurality of refracted beams. The diffraction means comprises a cylindrical body, and the device further comprises two arrays of optical sources and/or receivers. The arrays are disposed at opposite faces, respectively, of the body, each of the optical receivers having an optical axis aligned with one of the discrete angles. A perfect shuffle network may comprise a plurality of nodes interconnected by such a coupler, each node comprising a transmitter operable at several wavelengths a receiver, and means for determining whether a received signal is to be relayed and, if so, the appropriate transmission wavelength.

21 Claims, 9 Drawing Sheets

| REGION I<br>n=1<br>$E_I(x,z,t)$ | REGION II<br>n(x,z)<br>$E_{II}(x,z,t)$ | REGION III<br>n=1<br>$E_{III}(x,z,t)$ |
|---|---|---|

OPTICAL INTERCONNECTION DEVICE

This is a continuation-in-part of International patent application number PCT/CA 90/00119 filed Apr. 11, 1990 and designating the United States of America.

FIELD OF THE INVENTION

This invention relates to optical devices, and is especially, but not exclusively, applicable to $N \times N'$ interconnectors or couplers such as are used in local area networks and backplanes of telecommunications and computer equipment. Embodiments of the invention may also be used to interconnect components in integrated circuits, to interconnect integrated circuits on a circuit board, and in analogous situations in the field of optical communications, especially where single mode optical fibres are to be interconnected.

The invention also relates to optical interconnects or couplers having limited or selective coupling capability in that each input port is coupled to preselected ones of a plurality of output ports. The invention also encompasses lightwave communications systems incorporating such couplers and, for example, the so-called "multihop" networks including the afore-mentioned couplers having limited or selective coupling capability.

In this specification, the term "optical" is used to embrace both visible and invisible lightwaves.

BACKGROUND

An $N \times N'$ star coupler is one of the key elements in Local Area Network (LAN) applications of optical fibre. The simplest single-mode $2 \times 2$ star coupler can be manufactured by bringing the cores of two single-mode fibres sufficiently close together over an appropriate coupling length. Various such structures have been built by using etching, grinding and polishing, or fusion. A $2 \times 2$ star coupler can be used as a basic building block to construct larger $N \times N'$ couplers where N is equal to an arbitrary power of two. However, this involves interconnecting a large number of $2 \times 2$ couplers, increasing the excess loss for larger values of N.

European patent application number 0340987, published Nov. 8, 1989, [which is incorporated herein by reference] discloses an $N \times N'$ star optical coupler comprising a dielectric slab and two arrays of strip waveguide formed on a glass substrate. Opposite surfaces of the dielectric slab, to which the strip waveguides are attached, are curved. The radius of curvature and the distance between the surfaces are such that the optical axis of each waveguide at one surface extends radially across the slab to the centre of the other curved surface.

The configuration is said to provide even distribution of light from each waveguide to the waveguide at the opposite side of the dielectric slab. The optimized efficiency of such a coupler varies between 0.34 at the edge and 0.55 at the middle of the array, which is not entirely satisfactory. This gives better coupling efficiency compared with a slab having parallel sides, in which light from a particular input waveguide will cover more than the entire area of the opposite face, so it is relatively inefficient since much of the light is diffused before it reaches the output side of the coupler.

U.S. Pat. No. 4,057,319 discloses a coupler connecting one fibre in a bundle to the fibre in another bundle. A phase hologram plate is interposed between an input bundle of fibres and the output bundle of fibres. The phase hologram effectively focuses the light onto the output optical fibre and so improves coupling efficiency. A disadvantage of this device is that it is suitable only for individual connections and hence not suitable for applications requiring $N \times N'$ coupling.

U.S. Pat. No. 4,838,630, issued Jun. 13, 1989 [and incorporated herein by reference] discloses a planar optical interconnector for $1 \times N$ or $N \times 1$ coupling in interconnecting integrated circuits. The interconnector comprises a Bragg planar volume hologram which distributes optical signals, but is not capable of $N \times N'$ coupling.

U.S. Pat. No. 4,705,344, issued Nov. 10, 1987, [which is incorporated herein by reference] disclosed an interconnection device for optically interconnecting a plurality of optical devices. The interconnection device comprises an optically transparent spacer with photosensitive material on its opposite sides. Fringes are formed, fixedly positioned, on one of the surfaces. The fringes comprise a plurality of "sub-holograms". The other surface has positions for the optical devices. The fringe pattern is formed by directing a coherent light beam through the spacer and photosensitive material to one position and directing a second coherent light beam from a second position to interfere with the first beam. Each source device emits a light beam which traverses the transparent spacer, is reflected by the holograph on the opposite face, and returns to a different position. The hologram is, in effect a plurality of discrete holograms each one dedicated to one pair of positions. This kind of interconnection device provides logic functions for optical computing but is limited to $1 \times N$ coupling.

Thus, none of these known devices can provide N by N coupling with an efficiency and simplicity which can be considered satisfactory.

There remains a need for an optical interconnector with improved coupling efficiency for use in coupling single mode waveguides, for example optical fibres, in a number of applications such as local area networks, back planes of telephone switches and also in integrated circuits or circuit boards and similar situation where a large number of connections need to be made in a very limited space.

SUMMARY OF INVENTION

According to one aspect of the invention, there is provided an optical device comprising a stratified volume Bragg diffraction means, for example a hologram, having its refractive index varying spatially according to the expression:

$$n(x,z) = 1 + \sum_m \sum_{m'} \Delta_{m,m'} \sin(\vec{k}_{m,m'}{}^* \cdot \vec{r})$$

where
x and z are ordinates of the block;
$\vec{k}_{m,m'}{}^*$ is the spatial frequency vector;
m is an input position or mode, corresponding to one optical axis;
m' is an output position or mode, corresponding to one optical axis;
m and m' taking on integer values that determine the number of input/output modes;
$\Delta_{m,m'}$ is the coefficient of coupling between m and m'; and
r is the space vector.

In one, preferred, embodiment of the present invention, suitable for interconnecting optical communication channels, the device comprises a body having cylindrical opposed faces, said stratified volume Bragg diffraction means being provided in said body such that its refractive index varies spatially and periodically in one plane of the body, the arrangement being such that a planar light wave incident upon one of said faces of the body in said plane, at a predetermined angle, with the electric field of such light wave extending in the same direction as the axes of said cylindrical opposed faces, will be refracted to emerge at one or more discrete angles determined by the spatially varying refractive index, such incident light being distributed substantially equally among the plurality of output refracted beams.

Such a diffraction means may be arranged to couple substantially all of the input light to the predetermined refracted beams, i.e. with minimal loss.

According to another aspect of the invention, an $N \times N'$ optical interconnector comprises a planar body having cylindrical opposed faces and two arrays of optical sources and/or receivers, said arrays being disposed one at each of said faces, respectively, said body having a refractive index which varies spatially and periodically with the electric field of such light wave extending in the same direction as the axes of said cylindrical opposed faces, such that light emanating from each of said sources is distributed equally among the receivers at the opposite face.

In such embodiments, the refractive index $n(x,z)$ of the stratified volume Bragg diffraction means varies spatially in accordance with the expression:

$$n(x,z) = 1 + \sum_{m=-M}^{+M} \sum_{m'=-M}^{+M} \Delta_{m,m'} \sin(\vec{k}_{m,m'}{}^* \cdot \vec{r})$$

where x and z are ordinates of the block;

d is the radius of curvature of the curved faces;

$\vec{k}_{m,m'}{}^*$ is the spatial frequency vector;

m is an input position or mode, corresponding to one optical axis;

m' is an output position or mode, corresponding to one optical axis;

m and m' taking on integer values that determine the number of input/output modes;

$\Delta_{m,m'}$ is the coefficient of coupling between m and m';

r is the space vector; and

N is the total number of modes and is equal to $2M+1$.

The optical sources/receivers may comprise waveguides, for example optical fibres, or electro-optic devices for directing or receiving light. Each optical source is positioned so as to direct light along an optical axis extending radially of one face to the middle of the opposite face. Conversely, each optical receiver is positioned to receive light along an optical axis extending radially of the face with which the receiver is associated from the middle of the opposite face. Preferably the arrangement is such that substantially all of the light from each source is received by the optical receivers.

According to still another aspect of the invention, there is provided a method of making a diffraction means for an optical interconnector by irradiating a body of photorefractive material having cylindrical opposed faces using a two wave mixing process employing two light beams comprising substantially planar waves, the method comprising the steps of:

(i) aligning the body with its cylindrical axes transverse to the plane of said substantially plane waves;

(ii) directing one of said light beams across said body in said plane;

(iii) directing the other of said light beams across said body, in said plane, in succession, at a plurality of predetermined angles to the first light beam;

(iv) directing said one of said light beams across said body at a different angle and repeating steps (iii) and (iv), such that the refractive index of the irradiated body varies spatially and periodically in the plane of said waves, such that light incident upon said body in said plane at one of said discrete angles will be refracted to emerge in said plane at a plurality of different angles.

According to a further aspect of the invention, a method of making a diffraction means for an optical interconnector comprises the steps of:

(i) irradiating a planar body of photorefractive material by means of a first coherent light source along an axis at a predetermined axis to the body, the light comprising a substantially planar wave in the plane of the body;

(ii) irradiating the body by means of a second coherent light source along an axis at a predetermined axis to the light from the first source, and p (iii) recording the resulting interference pattern in the slab;

(iv) maintaining the position of the first source, (v) rotating the second source stepwise, each step by a predetermined angle, and repeating steps (i), (ii) and (iii), for each step; rotating the first source stepwise by a plurality of predetermined angles and, for each step, repeating step (v).

According to yet another aspect of the invention, apparatus for producing a diffraction means for an optical interconnection device comprises first and second sources of substantially planar light wave, means for supporting a body of photorefractive material, said body having cylindrical opposed faces, so as to be irradiated by light from both said sources, the electric fields of the planar light waves extending in the same direction as the cylindrical axes of said opposed faces, means for rotating one of said sources stepwise relative to the other source and about an axis extending through said body, means for rotating the other source stepwise about the same point as the rotation of the first source, the resulting interference pattern being recorded in said body such that a light beam incident upon one of said opposed faces will be refracted and distributed equally among a plurality of output beams emerging from the other of said opposed faces.

According to a further embodiment of the invention, apparatus for providing a diffraction means for an optical interconnector comprises:

a support for the body of photorefractive material having cylindrical opposed faces;

a plurality of optical devices in two planar arrays, one each side of the support, the devices being positioned with their optical axes extending radially from a common point and mutually spaced by a predetermined angle, said devices comprising plane wave light sources for providing planar light waves with their electric fields extending in the same direction as the cylindrical axes of said cylindrical opposed faces;

means for selectively energizing pairs of said devices in succession to vary the refractive index of the body spatially and periodically in the plane of said arrays such that a light beam incident upon one of said opposed faces will be refracted and distributed equally among a plurality of output beams emerging from the other of said opposed faces.

One embodiment of the present invention comprises an optical interconnection device which has its spatially-varying refractive index configured so that each individual input light wave is coupled to selected ones of a plurality of outputs. Such a coupler finds application in so-called multihop lightwave communication networks.

The design of multigigabit local lightwave networks has received great attention. Some of the proposed optical fiber based networks adopt packet switching which was originally designed for data traffic. There is currently a trend to combine various types of traffic on one network. Various techniques have been proposed or developed for this purpose. These networks are intended for multi-user applications, e.g., local and metropolitan area networks with potentially more than a terahertz of bandwidth, even though each user is constrained by the electronics to access only a small portion of the available bandwidth. For example, in a wavelength division multiplexing (WDM) passive broadcast star network, although the rate at which any one user transmits information is limited by the electronics, multiple users can transmit on wavelengths $\lambda_m$ where $m = 1, 2, \ldots, N$ and the lightwaves are combined in the passive star coupler. The superimposed light signals are made available to all the receivers, with each receiver tuning to one wavelength. A disadvantage of this approach is that pretransmission coordination is required so that each receiver knows to which channel it must tune for each time interval. Also, users need to rapidly and accurately tune the receivers (or transmitter) over the available band to allow any user to communicate with any other user.

In order to overcome these disadvantages of standard multichannel systems, it has been proposed to use a so-called "multihop" approach. In a multihop system, to transmit a packet from one user to another, may require routing the packet through intermediate users, each repeating the packet on a new wavelength, until the packet is finally transmitted on a wavelength that the destination user receives. In other words, a packet may need to take multi hops to reach its destination. With the multihop approach, many packets are concurrently circulating through the network; some fraction of these are new packets and the remainder are repeated packets. U.S. Pat. No. 4,914,648 by A. Acampora et al., issued Apr. 3, 1990, discloses a multihop lightwave communication system implemented using a perfect shuffle topology.

Although such multihop networks offer advantages, a limitation can arise from the relaying of the signals. If a conventional passive star coupler is used, the data packets will be attenuated significantly each time they traverse it.

An object of the present invention is to mitigate this problem.

According to yet another aspect of the invention, there is provided an optical device comprising a stratified volume Bragg diffraction means, for example a hologram, having its refractive index varying spatially according to the expression:

$$n(x,z) = 1 + \sum_m \sum_{m'} \Delta_{m,m'} \sin(\vec{K}_{m,m'}^* \cdot \vec{r})$$

wherein
$\sin(\gamma_m d) = 1$
m is an integer value where $$\gamma_m = \frac{\omega}{2C} \sqrt{\sum_{m'} \Delta_{m,m'}^2}$$

and where
x and z are ordinates of the block;
$\vec{k}_{m,m'}^*$ is the spatial frequency vector;
m is an input position or mode, corresponding to one optical axis;
m' is an output position or mode, corresponding to one optical axis;
m and m' taking on integer values that determine the number of input/output modes;
$\Delta_{m,m'}$ is the coefficient of coupling between m and m';
and
r is the space vector.

The physical configuration of such an optical interconnection device may be similar to that described above with reference to the first aspect of the invention. It may also be made using much the same method of manufacture as described above.

A limited-broadcast coupler comprising such a body can be designed for virtually any arbitrary shuffle network with the following parameters:
p: Degree of graph
I: Number of columns
$N = Ip^I$: Total number of interface nodes.

According to another aspect of the invention, there is provided a communication network comprising a plurality of nodes interconnected by such a limited or selective coupler.

The limited-broadcast coupler effects the necessary physical connections of two successive columns of the shuffle network. Having access to such a limited-broadcast coupler as a central piece of the network will make many desired architectures feasible for future optical networks. A space-varying refractive index slab is introduced as a key design element for such a coupler.

The network may comprise a plurality of said optical devices connected in tandem, each device having a passband overlapping the passband of the device to which it is coupled, whereby signals having wavelengths within the overlapping regions of the band will be relayed through said interconnecting devices.

The network may be arranged such that the wavelengths of light beams transmitted through the network are selected to correspond substantially with peaks of the period of the periodic refractive index.

In embodiments of each of the foregoing aspects of the invention, the spatial frequency vector $\vec{k}_{m,m'}^*$ is determined according to the expression $$\vec{K}_{m,m'}^* = |\vec{K}_{m,m'}^*|(\vec{1}_x \cos\theta_{m,m'}, 0, \vec{1}_z \sin\theta_{m,m'})$$

$$|\vec{K}_{m,m'}^*| = 2k\sin\frac{|m'\theta_o - m\theta_o|}{2} \approx k\theta_o|m' - m|$$

k is the optical wave vector (propagation factor $$\frac{2\pi}{\lambda} \text{ and } \theta_{m,m'} = \frac{\theta_o}{2}(m + m') \qquad (6)$$

and where $\theta_o$ is the angle between optical axes of adjacent inputs

DESCRIPTION OF PREFERRED EMBODIMENTS OF THE INVENTION

Figure 1:
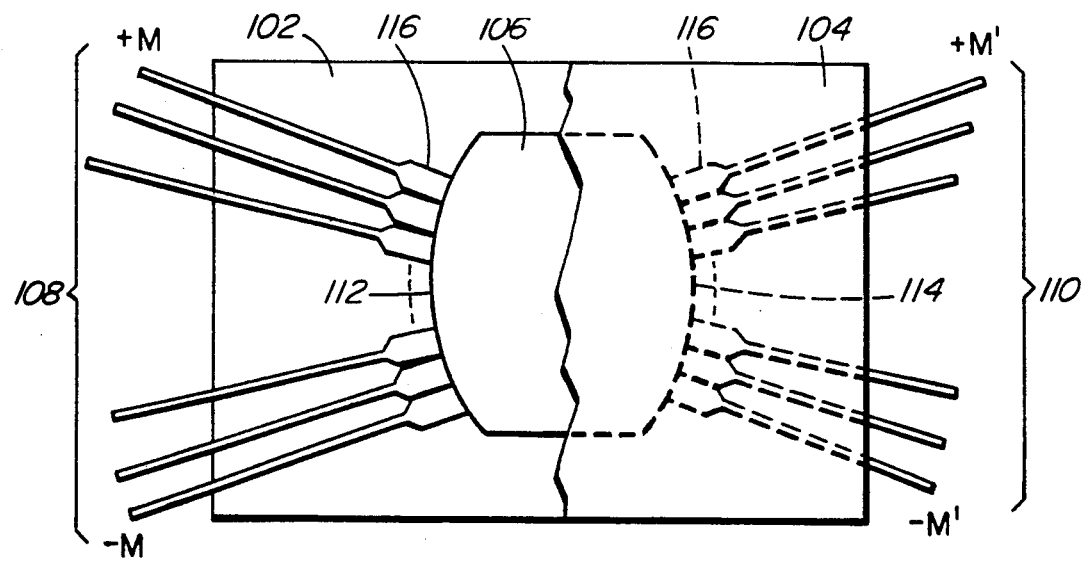
FIG. 1 is plan view, partially cut away, of an optical interconnector.

FIG. 1 shows an optical interconnector comprising a glass substrate formed by two plates 102 and 104, respectively. A diffraction means in the form of body 106, of dielectric material, such as lithium niobate (LiNbO₃) formed as a Bragg volume hologram, is sandwiched between the two plates 102 and 104. For other suitable materials the reader is directed to a paper entitled "Two-Wave Mixing in Nonlinear Media", IEEE Journal of Quantum Electronics, Vol. 25, No. 3, Mar. 19, 1989 which is incorporated herein by reference. Juxtaposed surfaces of the glass plates 102 and 104 are recessed to accommodate the block 106. Two arrays of single mode optical fibres 108 and 110, respectively, abut opposite faces 112 and 114, respectively, of the block 106. The opposite faces 112 and 114 are cylindrical sections and symmetrical. The distance between the faces 112 and 114, at their midpoints, is equal to the radius of curvature, d, of the surfaces 112 and 114.

The end portions 116 of the optical fibres 108, 110, where they abut the block 106, are enlarged to about 100 microns diameter which is about ten times the diameter of the typical single mode optical fibre. The transition between each single mode fibre and its enlarged end portion is gradual i.e. tapered.

The thickness of the dielectric body 106, is equal to the width of each of the enlarged portions 116, i.e. about 100 microns for a 9×9 coupler, so that substantially all of the light incident upon its end faces 112, 114 is channelled into the attached optical fibres. The optical fibres 108 and 110 serve as sources or receivers, the sources being arranged to transmit "nearly plane wave" light beams.

Figure 2:
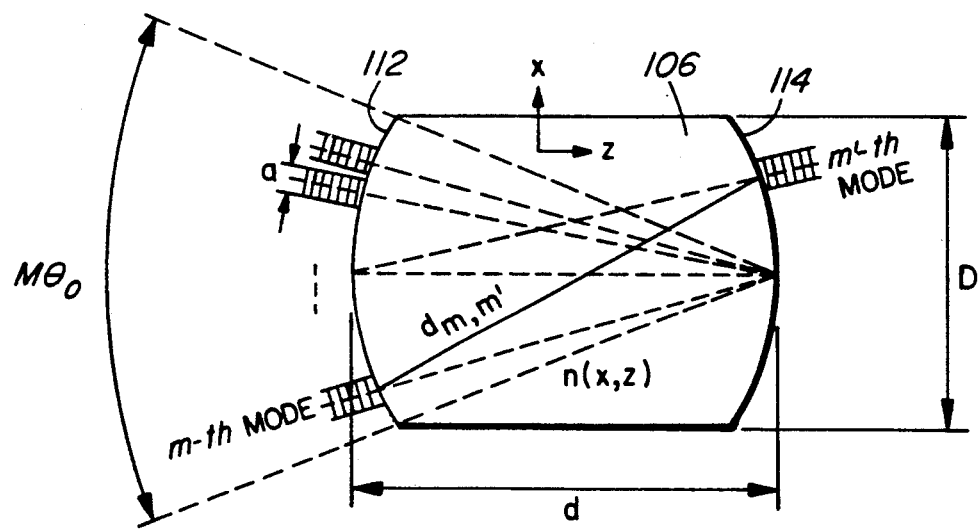
FIG. 2 is a schematic representation of the optical interconnector.

The optical interconnector is represented schematically in FIG. 2. The number of fibres in each array 108, 110 is N=2M+1. Thus there are N=2M+1 nearly plane wave inputs directed from arcuate surface 112 towards the centre of arcuate surface 114, and vice versa. The transit distance i.e. the distance between the arcuate surfaces 112 and 114 at their mid-points is d and the arc length of each arcuate surface is D. Each enlarged end portion 116 on the input array has a width a such that $$aN = D$$

The width a should be large enough compared to the spatial wavelength of n(x,z), i.e., $$a > \frac{2\pi}{|\bar{K}_{m,m'}{}^*|}$$

The width of the body 106, i.e. the distance d between the arcuate surfaces 112, 114 at their midpoints, is defined as:

$$d = \frac{D}{M\theta_0}$$

The width should be large enough to satisfy the thick grating condition given later by Equation (3); while the geometry should also meet the condition defined later by Equation (28). The same arguments apply to the output surface of the coupler. A simple investigation shows that D increases as M² while d increases as M.

In use, a beam of light emanating from any one of the array of optical fibres 108 will be diffracted by the thin film body 106 into a plurality of modes, one for each of the array of optical fibres 110 at the opposite side of the body 106. Conversely, light emanating from any one of the array of optical fibres 110 will be diffracted into a plurality of modes, one for each of the array of optical fibres 108.

As shown in FIG. 2, the z ordinate extends in the direction of the axis joining the middles of the arcuate faces 112, 114, and the x ordinate is perpendicular to it. The arcuate faces 112, 114 are actually cylindrical segments. The refractive index of the block 106 is n(x,z). The number of optical fibres in each array, N, is 2M+1 and the angle between the optical axes of adjacent optical fibres is $\theta_0$ degrees.

The optical fibre whose optical axis coincides with the middle of the two arcuate surfaces 112 and 114, respectively, is deemed to be the 0th mode and the modes on either side of that axis are numbers 1 to +M and 1 to −M.

Figure 3A:
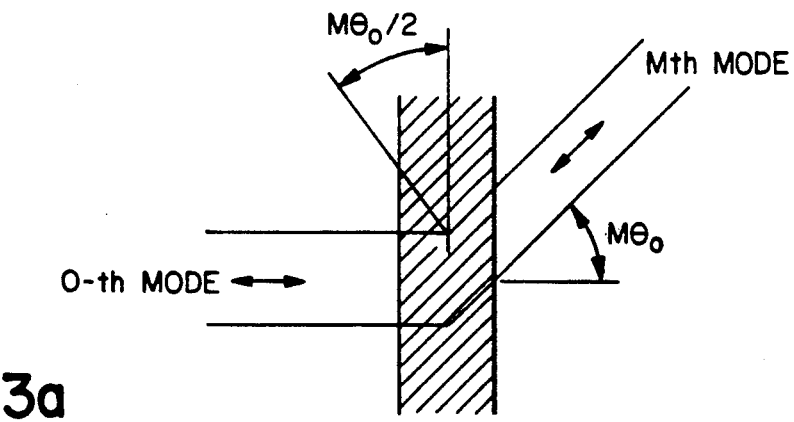
FIG. 3(a), 3(b) and 3(c) depict refraction of an input light beam into three specified modes.
Figure 3B:
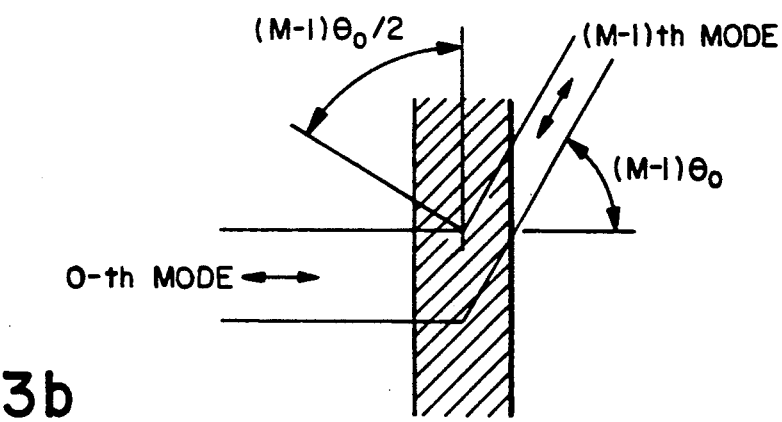
Figure 3C:
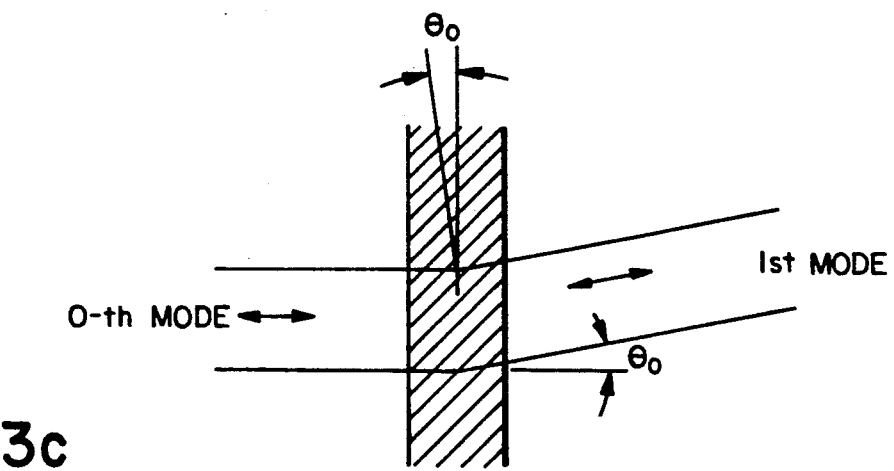

FIG. 3 illustrates refraction for a single perturbation term, the 0th mode in the array of optical fibres 108. In FIG. 3(a), the angle of refraction is $M\theta_0$ degrees, resulting in the Mth mode being transmitted to the endmost optical fibre in the array 110. FIG. 3(b) shows that the 0th mode is refracted at an angle (M−1)$\theta_0$ degrees and FIG. 3(c) shows that the 0th mode is refracted at an angle $\theta_0$ degrees. The same refractive index grating pattern will couple the O to Mth modes of the array of optical fibres 110 to the 0th mode of the array of optical fibres 108. The block 106 can thus be considered to be a plurality of sub-holograms, each providing a different output mode for a given input mode.

Each sub-hologram which, in effect, can be considered to be a $1\times(2M+1)$, or $(2M+1)\times 1$ coupler, is formed by two-wave mixing on a holographic film.

Figure 4A:
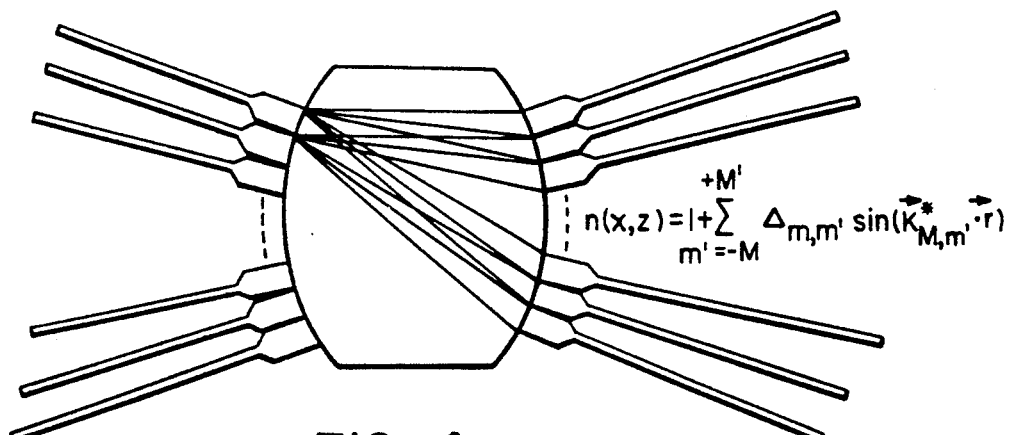
FIG. 4(a), 4(b) and 4(c) illustrate coupling modes individually and collectively.
Figure 4B:
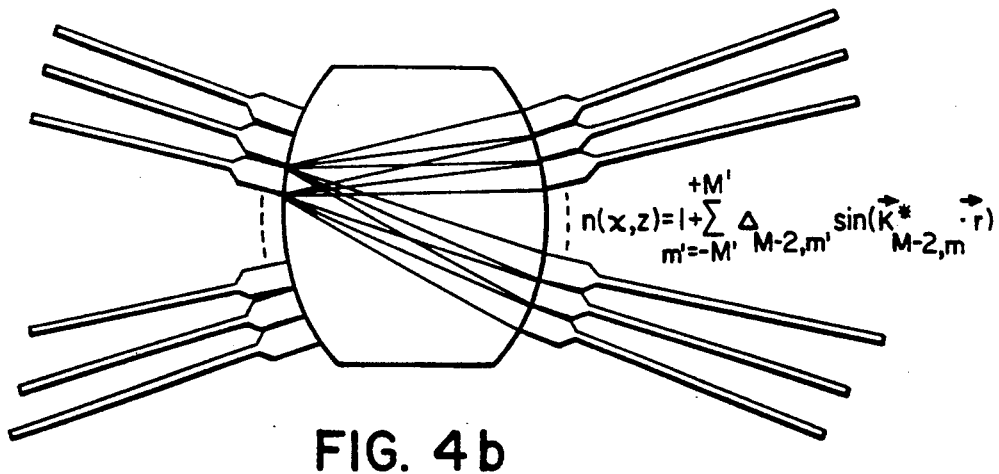

FIG. 4(a) and FIG. 4(b) illustrate how the coupler embodying the invention would couple the Mth mode and (M−2)th mode, respectively, to all output modes. For the Mth mode, the refractive index n(x,z) is given as:

$$n(x,z) = 1 + \sum_{m'=-M}^{+M} \Delta_{M,m'} \sin(\vec{K}_{M,m'}{}^* \cdot \vec{r})$$

For the (M−2)th mode, the refractive index n(x,z) is given as:

$$n(x,z) = 1 + \sum_{m'=-M}^{+M} \Delta_{M-2,m'} \sin(\vec{K}_{M-2,m'}{}^* \cdot \vec{r})$$

Figure 4C:
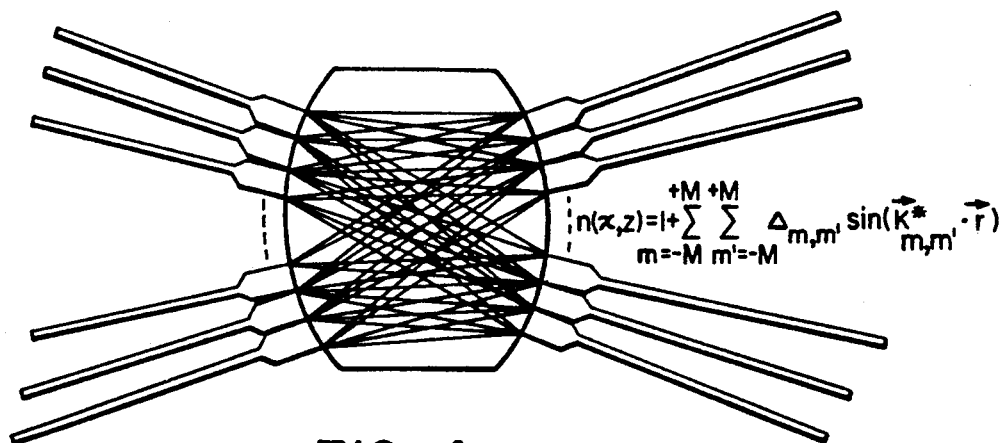

FIG. 4(c) illustrates how all of the modes are provided to achieve $N\times N'$ coupling, the refractive index n(x,z) varying in accordance with the expression:

$$n(x,z) = 1 + \sum_{m=-M}^{+M}\sum_{m'=-M}^{+M} \Delta_{m,m'} \sin(\vec{K}_{m,m'}{}^* \cdot \vec{r})$$

Thus the block 106 comprises a holographic pattern characterized by a spatial variation of this refractive index n(x,z).

Such a pattern can be implemented using known techniques, see for example a Ph.D. by M. Tabiani entitled "Spatial Temporal Optical Signal Processing", M.I.T., August 1979, a paper entitled "Bragg Gratings on InGaAsP/InP Waveguides as Polarization Independent Optical Filters", by C. Cremer et al, IEEE Journal of Lightwave Technology, vol. 7, No. 11, Nov. 1989, and also the disclosures of European patent application No. 0,339,657, U.S. Pat. No. 4,705,344 and U.S. Pat. No. 4,838,630. All of these disclosures are incorporated herein by reference. The pattern may be provided on a single film of photorefractive material (thick grating or volume holography on a single crystal or film).

Figures 5, 7:
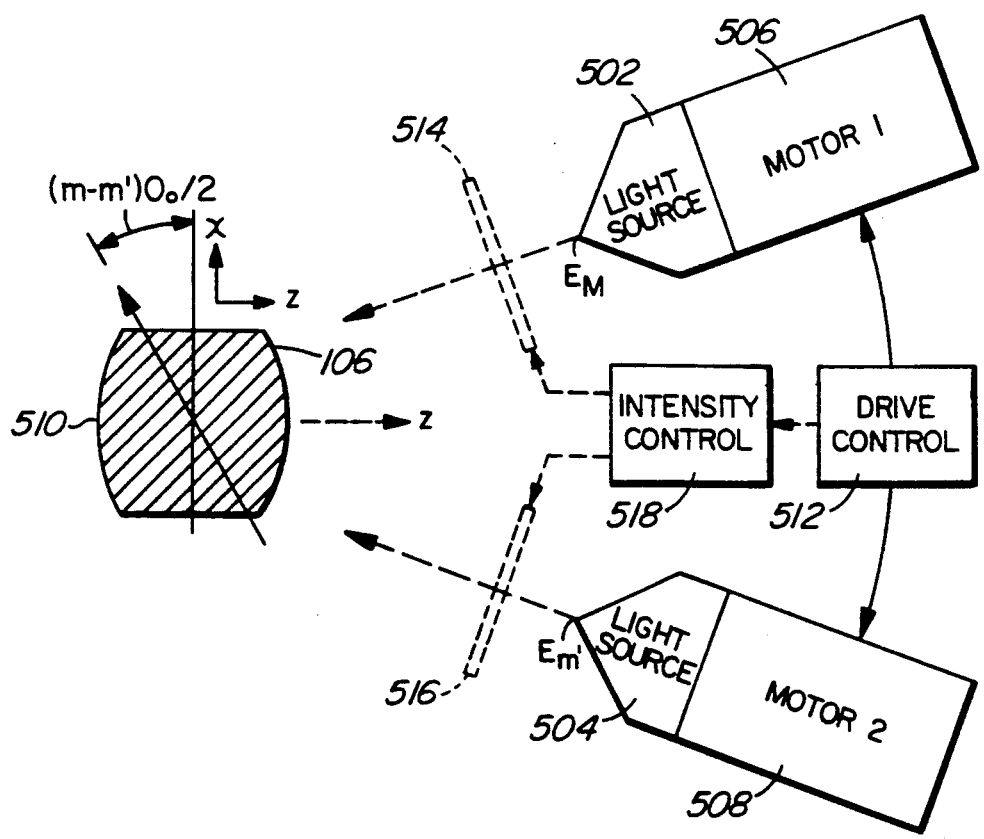
FIG. 5 is a schematic diagram of apparatus for preparing a body having a spatially varying refractive index for use in the optical interconnector of FIG. 1.
FIG. 7 represents regions of different refractive index in the body.

FIG. 5 illustrates manufacture of the body 106 with its spatially varying refractive index for an $N\times N'$ coupler. The implementation is based on two wave mixing employing a rotating mechanism, to mix $E_m$ and $E_m'$ by varying m and m' in successive steps.

In each step, with m and m' fixed, the interaction of the two beams $E_m$ and $E_m'$ is written on the photorefractive media. Then keeping m fixed, we vary m' from M+1 th N−(M−1) and repeat the writing process of each combination of $E_m$ and $E_m'$, respectfully. Next, we vary m from 1 to M and repeat the procedure.

FIG. 5 is a block schematic diagram of the apparatus for implementing such two-wave mixing, comprising two coherent light sources 502 and 504, respectively, mounted for rotation by two motors 506 and 508, respectively. The light sources 502 and 504 generate nearly plane waves $E_m$ and $E'_m$, respectfully. The centre of rotation for both of the motors 506 and 508, is the middle of the arcuate surface 112 which is furthest away as indicated at 510. The relative positions of the drive motors 506 and 508 are controlled by drive control means 512 which rotates the motors about point 510. The first motor, 506, rotates the first nearly plane wave source 502 ($E_m$) such that its propagation vector $\vec{k}_m$ makes an angle $$[m - (M+1)]\frac{\theta_0}{2}$$

with the −z axis. Second motor 508 aligns the second nearly plane wave source 504 ($E_m'$) such that its propagation vector $\vec{k}_{m'}$ makes an angle $$[m' - (M+1)]\frac{\theta_0}{2}$$

with the −z axis. For a fixed m, second motor 508 varies the $\vec{k}_{m'}$ direction incrementally such that m+ varies between m'1 to N−(m−1). Then, by varying m, the first motor 506 will bring the first source 502 to the new position and the process continues. In each position, the beams $E_m$ and $E_m'$ from the two sources, 502 and 504 are mixed to form (print) a desired term of Equation (8) on the photorefractive material. After printing all the terms of Equation (8), by body will have a refractive index varying in accordance with the equation (8). When placed between the two circular arrays 108 and 110 of the coupler shown in FIG. 1, the body 106 will form an $N\times N'$ optical interconnection.

The coupling pattern can be modified by varying the intensities of the beams $E_m$ and $E_m'$ any particular step to provide other then $N\times N'$ coupling. The intensity is controlled by means of attenuation filters 514 and 516 in the optical paths of light sources 502 and 504, respectively. The attenuation filters 514 and 516 are controlled by means of an intensity control means 518 which operates in conjunction with the drive means 512.

It is also possible to fabricate a star coupler which couples selectively rather than broadcast. There are applications in which it is desirable to couple, for example, one of a plurality of inputs to a limited number of a plurality of outputs. The photorefractive stratified Bragg volume hologram for such a coupler could be made in a similar manner to the full broadcast Bragg volume hologram described hereinbefore with a refractive index varying according to the general expression:

$$n(x,z) = 1 + \sum_{m=-M}^{+M}\sum_{m'=-M}^{+M} \Delta_{m,m'} \sin(\vec{K}_{m,m'}{}^* \cdot \vec{r})$$

where $\sin(\gamma_m d) = 1$  m = −M, . . . , 0, . . . , M
and where $$\gamma_m = \frac{\omega}{2C}\sqrt{\sum_{m'=-M}^{+M} \Delta_{m,m'}^2}$$

with C being the speed of light, then the power coupling coefficient between any input mode m and any output mode m' will be proportional to $\Delta_{m,m'}$, an element of the routing matrix.

$$\underline{\Delta} = \begin{pmatrix} & & \vdots & & \\ \cdots & & \Delta_{m,m'} & & \cdots \\ & & \vdots & & \end{pmatrix} \text{ for } m, m' = -M, \ldots, 0, \ldots, +M$$

Figure 12:
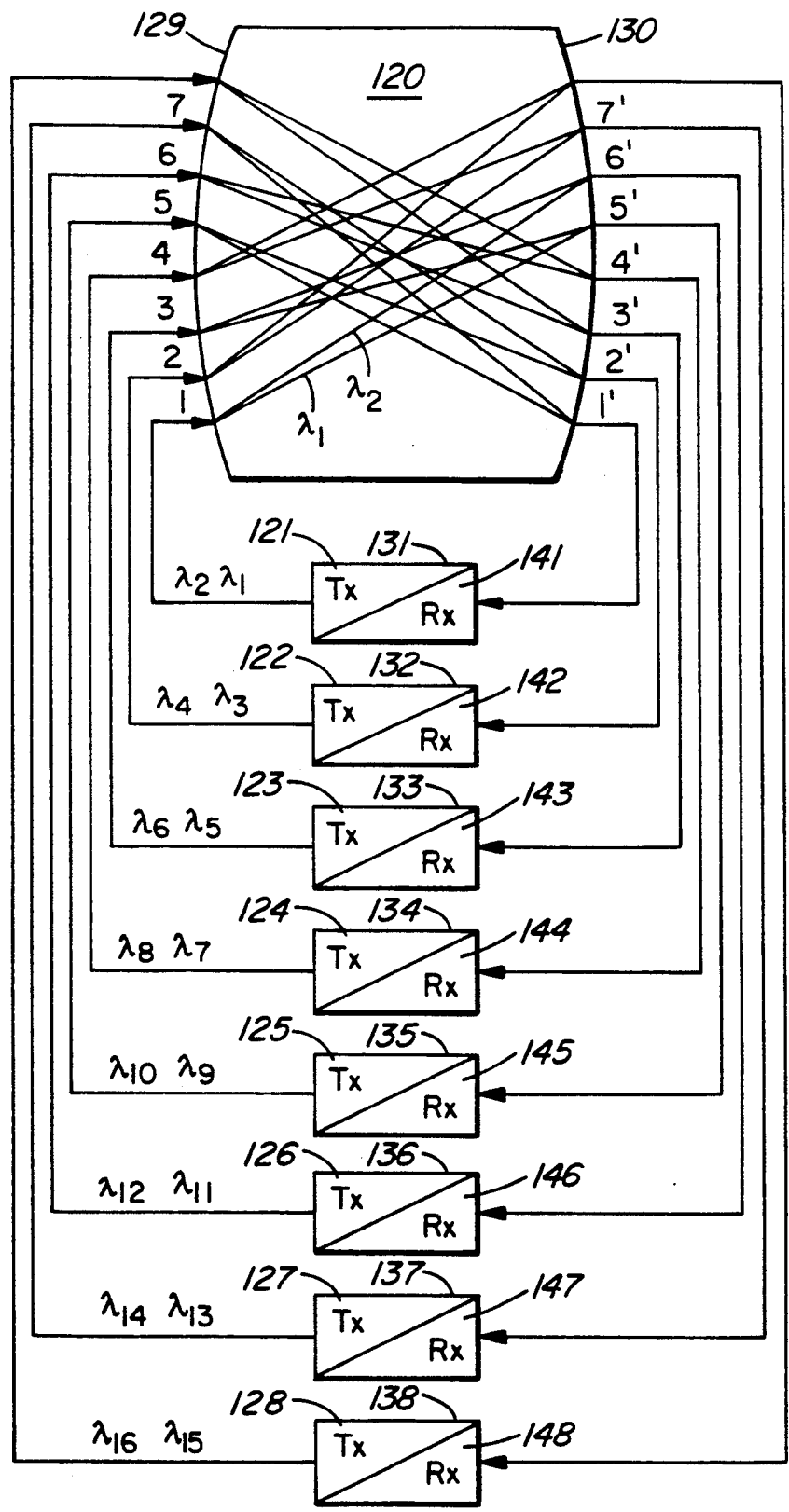
FIG. 12 is a simplified schematic diagram of a "shuffle net" lightwave communication system incorporating a limited-broadcast coupler and a plurality of user interfaces.

One application for such a selective coupler is high capacity local area networks. FIG. 12 illustrates a multihop perfect shuffle network comprising a passive optical star coupler 120 and a set of eight user interfaces 121-128, respectively. Eight input ports 1-8 are distributed along one curved face 129 of the coupler 120 and eight output ports 1'-8' are distributed along opposed curved face 130. The interfaces 121-128 comprise laser transmitters 131-138 and photodiode receivers 141-148, respectively. The input ports 1-8 are connected to respective outputs of laser transmitters 121-128 and output ports 1'-8' are connected to respective ones of the inputs of photodiode receivers 141-148.

The star coupler 120 comprises a stratified volume holographic medium having a spatially-varying refractive index. As in the case of the coupler of FIG. 1, the refractive index varies according to the general expression $$n(x,z) = 1 + \sum_{m=-M}^{+M} \sum_{m'=-M}^{+M} \Delta_{m,m'} \sin(\vec{K}_{m,m'}{}^* \cdot \vec{r})$$

The transmitters 121-128 are each capable of transmitting signals with either of two wavelengths, by selecting either of two lasers. Of course, a single laser which can be switched between two wavelengths might be substituted. The receivers 141-148 each have a photodiode receiver stage for detecting two wavelengths. These are not the same as the transmitter wavelengths but correspond to wavelengths of two other user interfaces to which the receiver is connected. When a signal from an individual transmitter arrives at the corresponding input port, and is launched into the coupler 120, it will be directed to one or the other of two output ports depending upon its wavelength. For example, a signal with wavelength $\lambda_1$ transmitted from laser transmitter 121 to input port 1 will be coupled to output port 5', whereas a signal at wavelength $\lambda_2$ transmitted by way of the same input port 1 will be directed to output port 6'.

In this particular case, the stratified volume hologram has a refractive index varying according to the expression $$n(x,z) = 1 + \sum_{m=1}^{2} \sum_{m'=1}^{8} \Delta_{m,m'} \sin(\vec{K}_{m,m'}{}^* \cdot \vec{r})$$

Hence, the coupler 120 functions to couple 2 out of 8, i.e. each input port 1-8 can couple to a predetermined two of the output ports 1'-8'.

Figure 13:
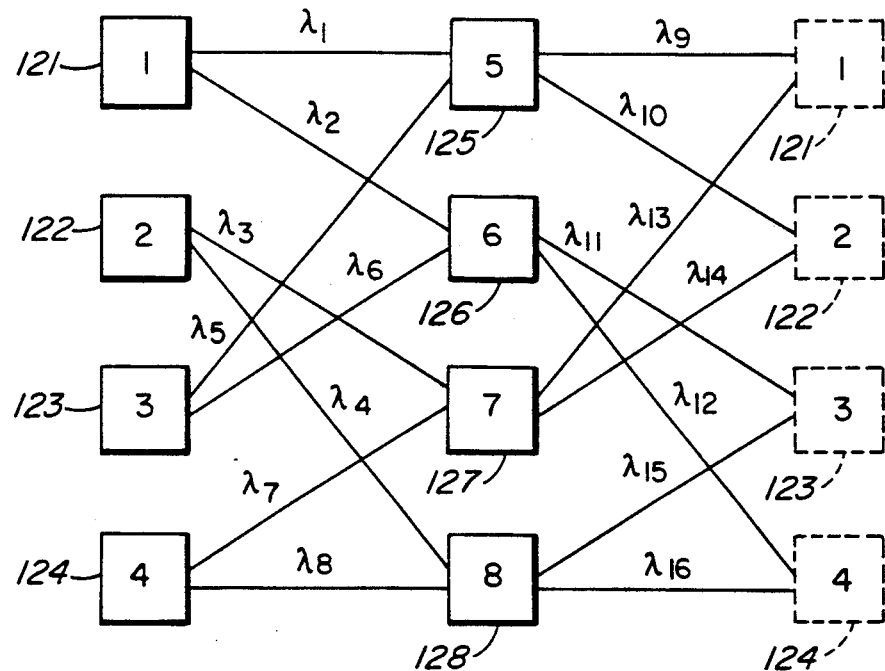
FIG. 13 is a connectivity graph for the shuffle net of FIG. 12.

The connectivity of the shuffle network of FIG. 12 is illustrated in FIG. 13. The network is a "perfect" shuffle network in that each user can communicate with every other user, even though each individual user interface has only two direct linkages to other user interfaces. In order to achieve this connectivity, some signals will be relayed. For example, if user 1 wishes to transmit a packet of data to user 6, user interface 121 will append user 6's address onto the packet, select wavelength $\lambda_2$, and launch the signal into input port 1. The signal will go directly to output port 6' and thence to receiver interface 146 where it will be demodulated, the address detected, and the packet delivered to user 6.

If user 1 wishes to send a packet to user 8, user interface 121 will address the packet, select a wavelength $\lambda_2$ to direct the signal to receiver interface 146 of user 6. In receiver interface 146, the address information will be detected and indicate that the packet is to be relayed to receiver interface 144 of user 4 on $\lambda_{12}$. In receiver interface 144 the address will be detected and again indicate that the packet is to be relayed. Consequently, user interface 124 selects a wavelength of $\lambda_8$ and transmits the packet by way of input port 4 and output port 8' to receiver interface 148. In receiver interface 148, the signal will be detected and the packet delivered to user 8.

Figure 14:
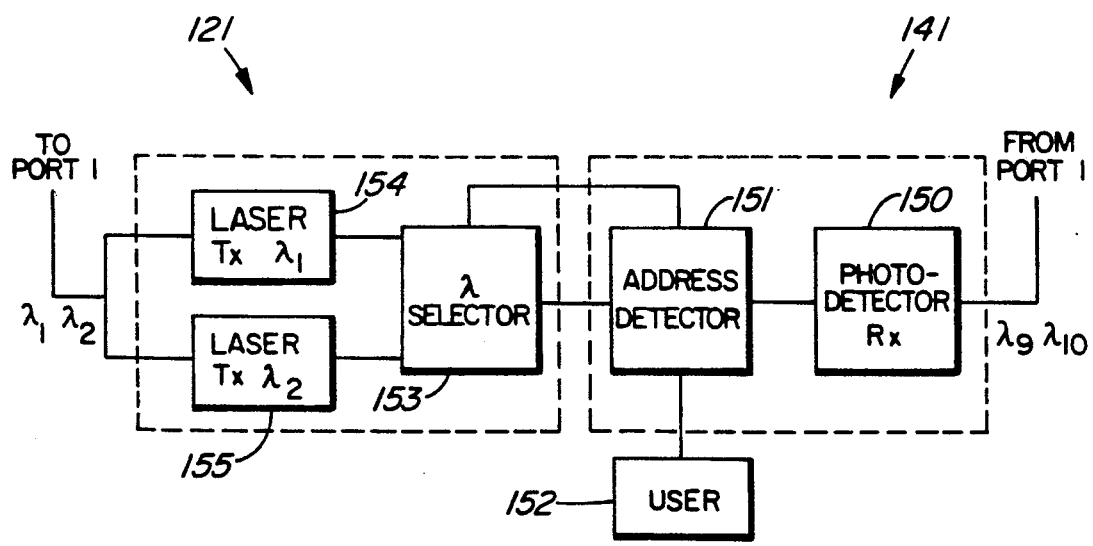
FIG. 14 is a block diagram of one of the user interfaces of FIG. 12.

FIG. 14 illustrates, as an example, receiver interface 141, which comprises a photodetector receiver stage 150 connected to output port 1'. The photodetector receiver stage 150 includes two photodiode detectors (not shown) for detecting signals having wavelengths $\lambda_9$ and $\lambda_{13}$, respectively. Detecting circuitry 151 decodes the address information prefixed to the incoming signal. If the address is its own, it directs the incoming signal to a hardware interface 152 for user 1. If, on the other hand, the address indicates that the message is to be relayed, in which case it will also contain information as to which user interfaces are in the relay chain. Laser transmitter stage 131 includes a selector 153 and lasers 154 and 155 having operating wavelengths $\lambda_1$ and $\lambda_2$, respectively. Detecting means 151 will control selector 153 to direct the outgoing signal to the appropriate one of transmitters 154 and 155.

When user 1 wishes to initiate a transmission, user hardware interface 152 will prefix the message with the appropriate routing address and detecting means 151 will select the appropriate one of lasers 154 and 155 for its transmission. The limited or selective star coupler 120 can be fabricated using similar techniques and apparatus as that illustrated in FIGS. 5 and 11 and described with respect to the manufacture of the full broadcast star coupler.

By way of example, for a 9×9 limited-broadcast coupler, the input array width is chosen such that $$a = 10 \text{MAX}\left(\frac{2\pi}{|\vec{K}_{m,m'}{}^*|}\right)$$

where MAX stands for maximum; and $M\theta_0 = 0.4$

Using M=4 for a 9×9 switch and a=100$\lambda$, D=900$\lambda$, where $\lambda$ is the wavelength of the optical signal and is equal to 2.5D, for $\lambda = 1 \mu m$, the dimensions are approximately 1mm×2.5mm in the x×z directions. In the y direction it is assumed to be larger.

It is preferable to expand the diameter of each single-mode input/output fiber. This expansion can be done by using appropriate tapers. Beam expansion ratios in the range of 5-10 are feasible with a corresponding insertion loss per taper of less than 0.01-0.025 dB. By using these numerical values, the thick grating condition holds. The specified routing matrix $\underline{\Delta}$ can be constructed by the wave-mixing method as discussed earlier.

Although a skilled artisan should be able to implement the invention on the basis of the foregoing description, the following mathematical explanation is provided to facilitate an understanding of the concepts upon which the invention is predicated.

Intuitive Analysis of Space-Varying Refractive Index Body

Referring again to FIG. 2, we define the m-th mode as a plane wave travelling to the direction that makes an angle $m\theta_0$ with the z axis; independent of y as:

$$E = e^{j\{\omega t - k[x \sin(m\theta_0) + z \cos(m\theta_0)]\}} \text{ C.C.} \quad (1)$$

where c.c. means complex conjugate of the first term, x, y and z are spatial coordinates, and $\omega$ and $k$ refer to optical frequency and wave vector (propagation factor $$\frac{2\pi}{\lambda}$$

This analysis is based upon an intuitive Bragg diffraction approach as disclosed by A. Yariv in the book "Optical Electronics", Holt, Rinehart and Winston, 1985, but modified to achieve appropriate mode interaction for N×N' couplers.

In order to couple the m-th input mode to the m'-th output mode as shown in FIG. 2, we must establish the following pattern of refractive index:

$$n(x,z) = 1 + \Delta_{m,m'} \sin(\vec{K}^*_{m,m'} \cdot \vec{r}) \quad (2)$$

where $\Delta_{m,m'}$ is the coupling coefficient between input m-th and output m'-th modes and $\vec{r}$ represents dimensions of the space, where $$\vec{r} = X \cdot \vec{1}_x + Y \cdot \vec{1}_y + Z \cdot \vec{1}_z$$

and $\vec{1}$ is the unity vector.

The following constraints on the direction and amplitude of vector spatial frequency $\vec{K}^*_{m,m'}$ must hold in order to satisfy the Bragg-diffraction thick grating conditions according to A. Yariv and M. Tabiani, respectively, $$\frac{|\vec{K}_{m,m'}^*|^2 d}{k} > 1 \quad (3)$$

where d is the thickness of the body 106 and k refers to the optical wave vector.

$$|\vec{K}_{m,m'}^*| = 2k\sin\frac{|m'\theta_0 - m\theta_0|}{2} \simeq k\theta_0|m' - m| \quad (4)$$

and $$\vec{K}_{m,m'} = |\vec{K}_{m,m'}^*|(\vec{1}_x \cos\theta_{m,m'}, 0, \vec{1}_z \sin\theta_{m,m'}) \quad (5)$$

where $$\theta_{m,m'} = \frac{\theta_0}{2}(m + m') \quad (6)$$

Coupling m=L-th Input Mode to N=2M+1 Output Modes

Based on the previous discussion on coupling the m=Lth input mode to N=2M+1 output modes (m'=−M, ..., 0, ..., M), we must maintain the following refractive index variation relation:

$$n(x,z) = 1 + \sum_{m'=-M}^{+M} \Delta_{L,m'} \sin(\vec{K}_{L,m'} \cdot \vec{r}) \quad (7)$$

with $\Delta_{L,m'} < 1$ plus conditions on $\vec{K}_{L,m'}$ defined by Equations (3) to (6) with m=L and with m'=−M, ..., 0, ..., +M.

As an example, consider vector $\vec{K}^*_{L,m'}$ for some specific cases like M=2 and M=4 and plot $\vec{K}^*_{L,m'}$ for L=0.

Figure 6A:
FIG. 6(a) and 6(b) illustrate amplitude and direction of different spatial frequencies $\bar{k}_{m,m'}{}^*$ that are necessary to couple the input m=0th mode to all output modes.
Figure 6B:
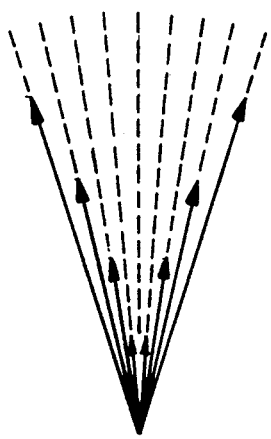

FIG. 6A shows a plot of $\vec{K}^*_{L,m'}$ to couple L=0-th input mode to output modes m'=−2, −1, 0, 1 and 2. FIG. 6B shows a plot of $\vec{K}^*_{L,m'}$ to couple L=0-th input mode to output modes m'=−4, −3, −2, −1, 0, 1, 2, 3, 4.

It should be realized that with the spatial varying refractive index given by Equation (7) with the constraints introduced in Equations (3) to (6), only m=L-th input mode will interact with all other N=2M+1 output modes (m'=−M, ..., 0, ..., +M). The degree of interaction depends on $\Delta_{L,m'}$ which is a vector of $\underline{\Delta}$, the routing matrix. However, by the condition on n(x,z) defined in Equation (7), no other input mode (m≠L) can be strongly coupled to any of the N=2M+1 output modes. This is due to the fact that none of the existing spatial vector frequencies $\vec{K}^*_{L,m'}$ meet the conditions in Equations (4) to (6) for such an input. For more mathematical details, the reader is directed to the paper by M. Tabiani referred to hereinbefore.

Coupling N=2M+1 Input Spatial Modes to N=2M+1 Output Modes (m,m'=−M ..., 0, ..., +M)

In order to couple all the N=2M+1 input modes to all the N=2M+1 output modes, i.e. the case where N=N', the following refractive index expression needs to be maintained:

$$n(x,z) = 1 + \sum_{m=-M}^{+M} \sum_{m'=-M}^{+M} \Delta_{m,m'} \sin(\vec{K}_{m,m'} \cdot \vec{r}) \quad (8)$$

with $\Delta m,m' < 1$ and $\vec{K}^*_{m,m'}$ satisfying the conditions defined by Equations (3) to (6) for all m,m'=−M, ..., 0, ..., +M.

Mathematical analyses indicate that if $$\Delta_{m,m'} = \Delta \quad (9)$$

and $$\sin\left(\frac{\omega d \sqrt{N}}{2C} \Delta\right) = 1 \quad (10)$$

where C is the speed of light, then the power coupling coefficient among input/output modes will be the same and equal to 1/N, namely:

$$T(m,m') = \frac{1}{N} \quad (11)$$

Such a power division is 100% efficient. This situation, with $\Delta_{m,m'}$ constant, gives broadcast coupling, i.e. each input couples to every output.

If we take $\Delta_{m,m'}$ from a specific preselected $N \times N'$ matrix $\underline{\Delta} = \ldots \Delta_{m,m'} \ldots$ with, $m,m' = -M, \ldots, M$ then, the power of any arbitrary m-th input element will be distributed to all $n = 2M+1$ output elements by a transmission coefficient proportional to $\Delta^2_{m,m'}$ for all $m' = -M, \ldots, 0, \ldots, M$.

In this case, the implementation is still based on two-wave mixing with a rotating mechanism and with an intensity control apparatus comprising the intensity control means 518 and attenuation filters 514, 516 described earlier with reference to FIG. 5.

Each time we mix $E_m$ and $E_{m'}$ with a fixed m and m', but with a variable intensity, the interaction of the two beams is written on the photorefractive medium. Now, with a fixed m, we vary m' from $m+1$ to $N-(m-1)$ while source intensities vary according to $\Delta^2_{m,m'}$. Next, we vary m from 1 to M and we continue this procedure.

In the case of the selective or limited-broadcast coupler, $\Delta_{m,m'}$ is an element of the $\underline{\Delta}$ routing matrix and $\bar{K}_{m,m'}$ must satisfy the conditions defined in equations 3 to 6 for all $m,m' = -M, \ldots, 0, \ldots, 0, \ldots, +M$.

Mathematical analyses indicate that if $$\sin(\gamma_m d) = 1 \quad m = -M, \ldots, 0, \ldots, M$$

where $$\gamma_m = \frac{\omega}{2C} \sqrt{\sum_{m'=-M}^{+M} \Delta^2_{m,m'}} \quad (11a)$$

with C being the speed of light, then the power coupling coefficient between any input mode m and any output mode m' will be proportional to $\Delta_{m,m'}$, an element of the routing matrix. Hence, because the coupling coefficient is not constant, the coupler will attenuate some signals and not others, depending upon whether or not a particular propagation mode has been selected.

Mathematical Analysis of Space-Varying Refractive Index Body

The following discussion is based on the mathematical analyses in the paper by M. Tabiani supra. In this discussion we will see how input m=L-th mode couples to output $m'=(L+1), \ldots, (L+M)$ modes with the specific refractive index variation in space. This analysis will specify the coupling coefficients among different input/output modes.

Mathematical Analysis of Space-Varying Refractive Index Slab

Consider the medium shown in FIG. 7 with the following refractive index variation in region II:

$$n(x,z) = 1 + \sum_{m'=1}^{M} \Delta_{L,m'} \sin\left\{ \vec{K}_{L,m'} \left[ x \cos\left(\frac{L\theta_o + m'\theta_o}{2}\right) - \quad (12)\right.\right.$$

$$\left.\left. z \sin\left(\frac{L\theta_o + m'\theta_o}{2}\right)\right]\right\}$$

with $|\Delta_{L,m'}| < 1$ and the conditions given by Equations (3) to (6) for $m=L$. Notice that, for all mathematical analysis $n(x,z)$ has been chosen to have M components, whereas for coupling applications $n(x,z)$ is assumed to have $N=2M+1$ components. Assume that the input wave is the sum of $M+1$ modes as:

$$E_I(x,z,t) = \quad (13)$$

$$\sum_{m=0}^{M} D_{inc,m} \exp\left\{ j\omega\left[t - \frac{x\sin(m\theta_0) + z\cos(m\theta_0)}{C}\right]\right\} +$$

$$c \cdot c$$

where $D_{inc,m}$ is the incidental wave coefficient of the m-th mode. Because of the form of the refractive index in Equation (12), the field in region II will be as follows:

$$E_{II}(x,z,t) = \quad (14)$$

$$\sum_{m=-\infty}^{+\infty} D_m(z) \exp\left\{ j\omega\left[t - \frac{x\sin(m\theta_0) + z\cos(m\theta_0)}{C}\right]\right\} +$$

$$c \cdot c$$

where $D_m(z)$ is the m-th coefficient of the wave in the second region.

defining $E_{II}(x,z,t)$ by the summation term on the right in Equation (14), we can accommodate $n(x,z)$ by using the wave equation:

$$\nabla^2 E_{II}(x,z,t) - \frac{[n(x,z)]^2}{C^2} \frac{\partial^2}{\partial t^2} E_{II}(x,z,t) = 0 \quad (15)$$

M. Tabiani had shown in the thesis referred to earlier, that two equations (12) and (14) may be substituted into Equation (15) to obtain the following coupled-mode equations:

$$\frac{dD_L(z)}{dz} = \frac{-j\omega}{2C} \sum_{m'=L+1}^{L+M} \Delta_{(m'+L),L} D_{m'}(z) \quad (16)$$

$$\frac{D_m(z)}{dz} = \frac{-j\omega}{2C} \Delta_{(m+L),L} D_L(z)$$

$$L + 1 \leq m \leq L + M$$

$$\frac{dD_m(z)}{dz} = 0$$

Else

Equation (16) is the coupled-mode equation for the system shown in FIG. 7 with $n(x,z)$ given by Equation (12). We can see that input mode L couples simultaneously to output modes $m=L+1, \ldots, L+M$, but input mode $(L+m')$ and output mode $(L+m'')$ with $m' \neq m''$ and $m', m'' \neq 0$ not coupled with each other, directly.

Thus Equation (16) shows that the refractive index $n(x,z)$ given by Equation (12) serves the purpose, as stated earlier. A detailed analysis of the system governed by Equation (16) can be performed as we will discuss it in the following subsection.

Solution of the Mode-Equation

We shall see the solution of Equation (16) for the case of L=0 by means of state-variable representation. Without loss of generality, we only need to consider modes 0 through M. Thus, if we let $\underline{D}(z)$ be an (M+1) dimensional column vector with components $D_m(z)$, we obtain:

$$\frac{d\underline{D}(z)}{dz} = \underline{\underline{A}}\underline{D}(z) \quad (17)$$

where $\underline{\underline{A}}$ is an (M+1)×(M+1) matrix with elements $$\underline{A}_{mm'} = \begin{cases} -j\frac{\omega}{2C}\Delta_{0,m} & m'=0, m \neq 0 \\ -j\frac{\omega}{2C}\Delta_{0,m'} & m=0, m' \neq 0 \\ 0 & \text{otherwise} \end{cases} \quad (18)$$

Suppose the slab in region II (FIG. 7) is illuminated by an input wave of the type presented by Equation (13), then the field in region III is $$E_{III}(x,z,t) = \quad (19)$$

$$\sum_{m=0}^{M} D_m(d)\exp\left\{j\omega\left(t - \frac{[x\sin(m\theta_0) + z\cos(m\theta_0)]}{C}\right)\right\} +$$

c.c where $$D(d) = \underline{\underline{\Phi}}(d)D_{inc} \quad (20)$$

and $\underline{\underline{\Phi}}(d)$ is the transition matrix associated with the state Equation (17).

The transition matrix $\underline{\underline{\Phi}}(z)$ can be found by a Fourier Transform method such as is disclosed by R. W. Brackett in Chapter 11 of the book entitled "Finite Dimensional Linear Systems", J. Wiley, New York, 1970. The result is as follows:

$$\Phi_{m\,m'}(d) = \begin{cases} \cos(\gamma_0 d) & m=m'=0 \\ -j\frac{\omega}{2C}\Delta_{0,m'}\frac{\sin(\gamma_0 d)}{\gamma_0} & m=0, m' \neq 0 \\ -j\frac{\omega}{2C}\Delta_{0,m}\frac{\sin(\gamma_0 d)}{\gamma_0} & m'=0, m \neq 0 \\ \delta_{m,m'} + \left(\frac{\omega}{2C}\right)^2 \Delta_{0,m}\Delta_{0,m'}\frac{[\cos(\gamma_0 d)-1]}{\gamma_0^2} & m, m' \neq 0 \end{cases} \quad (21)$$

where $$\gamma_0 = \frac{\omega}{2C}\sqrt{\sum_{i=1}^{M}\Delta_{0,i}^2} \quad m=0 \quad (22)$$

Considering Equation (21) in the specific case of the full broadcast N×N coupler, where $$\Delta_{0,i} = \Delta \quad (23)$$

and $$\sin(\gamma_0 d) = 1 \quad (24)$$

we can reach the following conclusions. The 0-th input mode is divided among M output modes m'=1, ..., M by the amplitude factor $1/\sqrt{M}$ or power factor 1/M. The 0-th input mode does not get coupled as depicted in FIG. 7, since $\cos(\gamma_0 d)$ is zero. However, referring to FIG. 2, since the distance between any input/output pair is not a constant, there will be some power at these output modes.

If we take n(x,z) given by Equation (12) with any arbitrary L instead of L=0; then L-th input mode couples simultaneously to M output modes m=L+1, ..., L+M, but (L+M') and (L+M'') with m'≠m'' and m', m''≠0 not coupled to each other, directly. Therefore, n(x,z) in Equation (8) will couple all N=2M+1 input modes to all N=2M+1 output modes with a 100% efficiency.

We use the configuration in FIG. 2 such that N input elements are equally spaced on the surface of the outer circle, while each input is aligned with the centre of the circle. Based on this configuration, the distance between the m-th input mode and m'-th output mode, $d_{m,m'}$ is no longer a constant, it depends on m, m' and $\theta_0$ parameters, such that for small angles:

$$d_{m,m'} = d\left[1 + mm'\left(\frac{\theta_0}{2}\right)^2\right] \quad (25)$$

Therefore, we must choose the parameters such that $$\frac{N^{\frac{1}{2}} \cdot \theta_o^2 \cdot d \cdot \Delta}{\lambda} = \text{Integer} \quad (26)$$

in order to keep Equation (24) valid for the configuration in FIG. 2. Then by properly choosing n(x,z) as given by Equation (8), for $\Delta_{m,m'}=\underline{\underline{\Delta}}$ and satisfying Equations (24) and (26), each input wave will be equally divided among the output array ports.

Considering Equation (21) in the alternative case of the selective or limited broadcast coupler of FIG. 12, where $\Delta_{0,i}$ is chosen as the zero-th column of the routing matrix $\Delta$ and $\sin(\gamma_m d)=1$ for m=0 we can reach the following conclusions. The 0-th input mode is divided among the M output modes m'=1, ..., M by the amplitude factor $$\frac{\Delta_{m,m'}}{\sqrt{\sum_{i=m}^{M} \Delta_{m,i}^2}} \quad m=0 \quad (27)$$

or the power factor $$\frac{\Delta_{m,m'}^2}{\sum_{i=m}^{M} \Delta_{m,i}^2} \quad m=0$$

As in the broadcast case, the 0-th mode does not go through since $\cos(\gamma_0 d)$ tends to zero. If we take $n(x,z)$ from equation 12 with any arbitrary non-zero L; the L-th input mode couples simultaneously to M output ports and no other input mode couples to any output mode. However, $n(x,z)$ in equation 8 will couple all the $N=2M+1$ input modes to all the $2M+1$ output modes with a coupling coefficient proportional to $\Delta_{m,m'}$, the elements of the routing matrix $\underline{\Delta}$.

As before, the N input elements are equally spaced on the surface of the outer circle, while each input is aligned with the centre of the circle. Also, the distance between the m-th input mode and the m'-th output mode, $d_{m,m'}$, again depends on m,m' and $\theta_0$ parameters, such that for small angles:

$$d_{m,m'} = d\left[1 + mm'\left(\frac{\theta_0}{2}\right)^2\right] \quad (27a)$$

In this case, however, the parameters are chosen such that:

$$\frac{\theta_0^2 d \sqrt{\sum_{m'=-M}^{+M} \Delta_{m,m'}^2}}{\lambda} = \text{Integer} \quad (27b)$$

$$m = -M, \ldots, 0, \ldots, M$$

in order to keep equation 25 valid for any m-th input mode for the configuration. Proper choice of $n(x,z)$ as given by equation 8, for $\Delta_{m,m'}$, selected by the coupler routing matrix and satisfying equation 24 for any m and satisfying equation 27a, will result in each input wave being divided among other ports with a coupling coefficient proportional to $\Delta_{m,m'}$.

Pattern for $\vec{K}^*_{m,m'}$

To realize the refractive index given by Equation (8), let us consider $\vec{K}^*_{m,m'}$, as a vector whose amplitude and direction satisfy the conditions given by Equations (4) to (6) for $m,m'=-M, \ldots, 0,1,2,3, \ldots, M$.

For small angles as $$|M\theta_0| << \pi, \quad (28)$$

by carefully examining the $\vec{K}^*_{m,m'}$ vectors, we discover an interesting pattern which can easily be realized by wave mixing.

Figure 8A:
FIGS. 8(a), 8(b) 9(a), 9(b) 10(a) and 10(b) illustrate vectors $\bar{k}_{m,m'}{}^*$ for star couplers having 2 and 4 output modes, respectively.
Figure 9A:
Figure 8B:
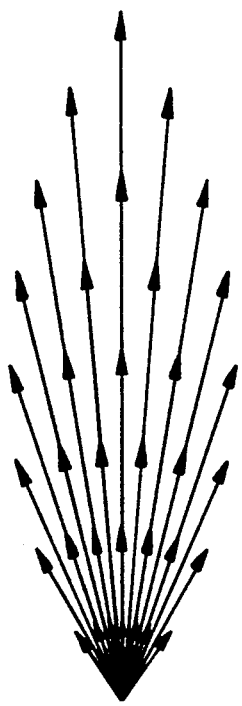
Figure 9B:

For simplicity, let us consider $\vec{K}^*_{m,m'}$ pattern in the following two simple cases:
a) M=2 for a 5×5 star coupler
b) M=4 for a 9×9 star coupler FIG. 8A is a plot of $\vec{K}^*_{m,m'}$ for M=2, for a 5×5 star coupler (m,m'=−2, −1, 0, 1, 2). FIG. 8B is a plot of $\vec{K}^*_{m,m'}$ for M=4, 9×9 star coupler (m,m'=−4, −3, −2, −1, 0, 1, 2, 3, 4). If we examine these vectors carefully as depicted in FIGS. 9A and 9B, tips of the $\vec{K}^*_{m,m'}$ vectors are located on different circles all with the same radius.

Figure 10A:
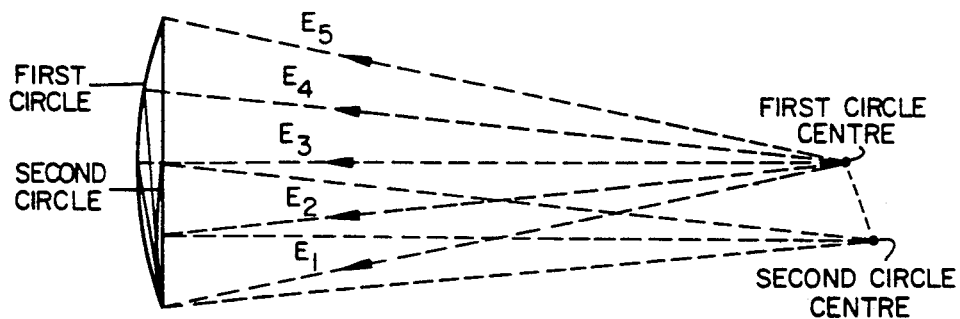
Figure 10B:
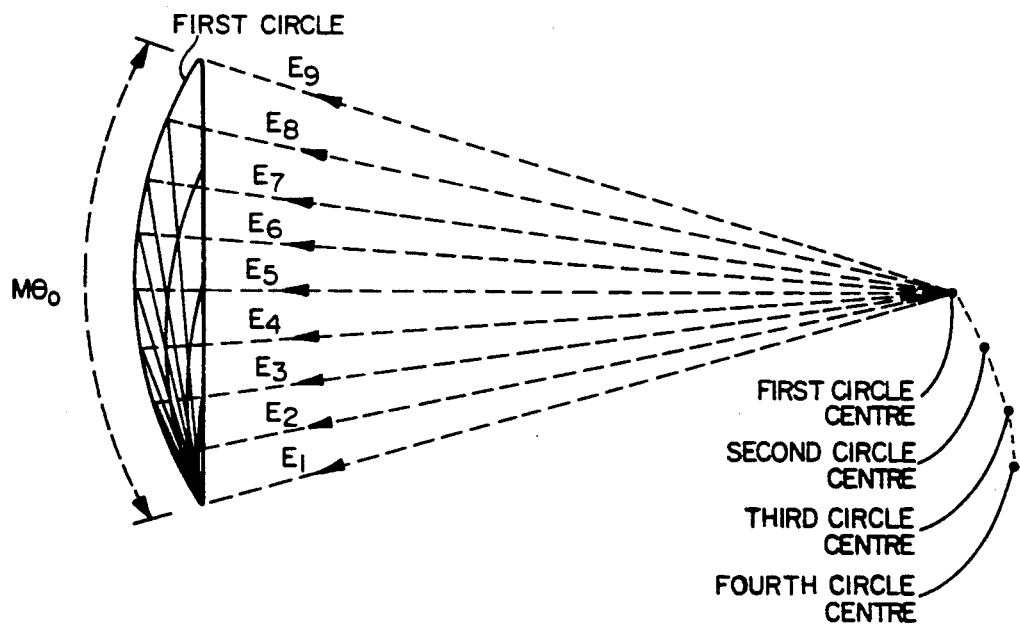

A more careful examination of these vectors as shown in FIGS. 10A and 10B, indicates the radius;

$$R = |\vec{k}| \quad (29)$$

where $\vec{K}$ represents the optical wave vector.

For an arbitrary M, there are M circles on each side, each with a radius $R=|\vec{k}|$. If we number these circles as shown in FIGS. 9A and 9B, on the first circle there are 2M vector tips. On the second circle, there are 2(M−1) vector tips and so on. That is, on the i-th circle there are 2(M−i+1) vector tips.

Wave Mixing Realization

Interaction of two laser beams inside a photorefractive medium, when the two beams have the same frequency, forms a stationary interference pattern. Its intensity makes a spatial variation inside the medium and proportionally creates refractive index variations in space as described by Pochiz Yeh in his paper entitled "Two-Wave Mixing in Non-Linear Media", IEEE Journal of Quantum electronics, vol. 25, No. 3, Mar. 19, 1989, which is incorporated herein by reference.

The electric field of these waves can be expressed as $$E_i = Ae^{j(\omega t - \vec{k}_i \vec{r})} + C.C. \quad i=1, \ldots, 2M+1 \quad (30)$$

where
$$|\vec{k}_i| = |\vec{k}| \quad (31)$$

with the direction of $\vec{k}_i$ being a variable.

According to Pochiz Yeh, the refractive index perturbation will be a periodic function in space with a spatial frequency $\vec{k}_m - \vec{k}_{m'}$ when $E_m$ and $E'_m$ are mixed.

Consider two previously described examples on construction of $\vec{K}^*_{m,m'}$ in creating the necessary refractive index given by Equation (8) for a 5×5 and a 9×9 coupler (see FIG. 10).

a) M=2, for a 5×5 star coupler:

In this case, we need to have N=5 waves $E_1$, $E_2$, $E_3$, $E_4$ and $E_5$ as shown in FIG. 10A to create all corresponding $\vec{K}^*_{m,m'}$. In order to configure four vectors located on the first circle, we must mix $E_1$ with $E_2$, $E_3$, $E_4$ and $E_5$. To construct two vectors $\vec{K}^*_{m,m'}$ on the second circle (and the last for M=2 case) according to the specific geometry shown in FIG. 10A, we need to mix $E_2$ with $E_3$, $E_4$.

b) M=4, for a 9×9 star coupler:

As shown in FIG. 10B we need to have N=9 waves ($E_1 \ldots E_9$) to create all corresponding $\vec{K}^*_{m,m'}$. In order to configure eight vectors $\vec{K}^*_{m,m'}$ located on the first circle, we must mix $E_1$ with $E_2$ to $E_9$. To construct six vectors $\vec{K}^*_{m,m'}$ located on the second circle, we must mix $E_2$ with $E_3$ to $E_8$. For four vectors $\vec{K}^*_{m,m'}$ located on the third circle, we must mix $E_3$ with $E_4$ to $E_7$. Finally, in order to create two vectors $\vec{K}^*_{m,m'}$ located on the fourth circle (the last for this example) we must mix $E_4$ with $E_5$ and $E_6$.

Based on these examples, with no loss in generality, to create all vectors $\vec{K}^*_{m,m'}$ in FIGS. 10A and 10B for an N×N' coupler with N=2M+1, we have to mix $E_1$ with $E_2$ to $E_N$
$E_2$ with $E_3$ to $E_{N-1}$
.
.
.
$E_N$ with $E_{M+1}$ and $E_{M+2}$.

Notice that, all of these waves have the same frequency but different directions. $E_1$ has an angle $-M\theta_0/2$ with $-z$ direction and $E_i$ has an angle $\theta_0$ with $E_{i-1}$, and so on. Therefore, we have to have only two waves at the same frequency. We mix the first one in the proposed $E_1$ direction. Then by rotation, we bring the second one in the direction of $E_2$, $E_3$, ... and $E_N$, respectively. In each position, we mix the field with the first one. In the next round, we bring the first one in the proposed $E_2$ direction and rotate the second field to bring it into the direction of $E_3$, ... and $E_{N-1}$. In each position we mix the field with the first one. The procedure is continued. In the last step, the first field is placed in the $E_M$ direction and the second wave on the $E_{M+1}$ and the $E_{M+2}$ direction while mixing the pairs in each position. Therefore, with this method, by two wave mixing we can create all vectors $\bar{K}^*_{m,m'}$ corresponding to $n(x,z)$ given by Equation (8).

DESIGN REQUIREMENT AND AN EXAMPLE

The proposed $N \times N$ star optical coupler is shown in FIG. (2). There are $N=2M+1$ nearly plane wave inputs directed towards the center of the circular input surface with a diameter D. Each element of the input array has a width a such that $$aN = D \tag{32}$$

The width a should be large enough compared to the spatial wavelength of $n(x,z)$, i.e., $$a > \frac{2\pi}{|\vec{K}_{m,m'}|} \tag{33}$$

The width of the slab is d and is defined as:

$$d = \frac{D}{M\theta_0}. \tag{34}$$

The slab width should be large enough to satisfy the thick grating condition given by Equation (3); while the geometry should also meet the condition defined by Equation (28). The same arguments apply to the output surface of the coupler. A simple investigation shows that D increases as $M^2$ while d increases as M. The medium with space-varying refractive index $n(x,z)$ given by Equation (8) may be created by the two wave mixing methods mentioned herein for a given N.

In order to obtain 100% efficiency, the parameters are selected in a way that conditions given by Equations (4), (6), (10) and (27b) are satisfied.

For the selective or limited-broadcast coupler, $\Delta_{m,m'}$ is determined by the routing matrix $$\underline{\Delta} = (\Delta_{m,m'})$$

To achieve wavelength division multiplexing, let us assume that $\lambda$ can vary between $\lambda - \delta$ to $\lambda + \delta$. The coupler will still operate if we keep the perturbation on term $$\frac{wd \sqrt{N} \Delta}{2C}$$

of Equation (10) to be much smaller than $\pi$. This can be done by limiting $\delta$ such that:

$$\frac{\delta}{\lambda} < \frac{\lambda}{2d\Delta \sqrt{N}} \tag{34A}$$

which means that the optical signal bandwidth is limited by the geometry of the coupler.

EXAMPLE

For a $9 \times 9$ coupler a is chosen such that Equation (33) is satisfied as $$a = 10 \text{MAX} \left( \frac{2\pi}{|\vec{K}_{m,m'}|} \right) \tag{35}$$

where MAX stands for maximum. Also, the condition given by Equation (26) is satisfied by choosing $$M\theta_0 = 0.4 \tag{36}$$

Using $M=4$ for a $9 \times 9$ star coupler given by Equation (4) we will have:

$$a = 100\lambda \tag{37}$$

and $$D = 900\lambda \tag{38},$$

where $\lambda$ is the wavelength of the optical signal and d is equal to 2.5D. That is, for $\lambda \simeq 1$ $\mu$m the dimensions are approximately 1 mm $\times$ 2.5 mm in the x by z direction. In the y direction it is assumed to be larger.

Equation (37) points to expanding the diameter for each single-mode input/output fibre. This expansion can be done by using appropriate tapers. Beam expansion ratios in the range of 5–10 are feasible with a corresponding insertion loss per taper of less than 0.01–0.025 dB. By using these numerical values, the thick grating condition governed by Equation (3) holds. The refractive index $n(x,z)$ in Equation (8) for a given M will be created as described hereinbefore with two wave mixing and rotation operation. Parameter $\Delta_{m,m'}$ should be chosen such that the conditions in Equation (9), (10) and (26) are satisfied.

It should be appreciated that, since N was defined as $2M+1$, the number of ports is an odd number. In the practical embodiments, where an even number of ports is preferred, the ninth port is simply not used. In essence, a row of zeros will appear in the connectivity matrix.

Bandwith Considerations

To achieve wavelength division multiplexing, we need to know the bandwidth of the limited-broadcast coupler. Let us assume that the optical signals with wavelengths $\lambda_i$ varying between $\lambda - \delta$ and $\lambda + \delta$ can go through the coupler without any major attenuation. We would like to calculate the 3–dB bandwidth for the coupler. The coupler will respond to signals, if we keep the wavelength perturbation on $$\frac{\omega d}{2C} \sqrt{\sum_{m'=-M}^{+M} \Delta_{m,m'}^2}$$

of equation 11a to be much smaller than $\pi$. To calculate the 3−dB bandwidth, instead of equation 11a, we must have:

$$\sin^2\left[\frac{\omega d}{2C} \sqrt{\sum_{m'=-M}^{+M} \Delta_{m,m'}^2}\right] = \frac{1}{2} \tag{39}$$

Since $$\frac{\omega}{C} = \frac{2\pi}{\lambda},$$

the 3−dB bandwidth will be a function of d, M and the routing matrix elements. However, the coefficients must satisfy the condition expressed by equation 27b, as well. To calculate the bandwidth in general, we will also use the condition expressed by equations 32, 34 and 36. Then we will present some numerical data for the special case of the 9×9 coupler.

Applying conditions expressed by equations 32, 34, and 36 in equation 27b, we will arrive at the following equation;

$$\frac{0.4 \, Na}{\lambda M^2} \sqrt{\sum_{m'=-M}^{+M} \Delta_{m,m'}^2} = I_0 \tag{40}$$
for $m' = -M, \ldots, 0, \ldots, +M$ where $I_0$ is an integer. With $$M \approx \frac{n}{2}$$

approximately, we will have:

$$\sqrt{\sum_{m'=-M}^{+M} \Delta_{m,m'}^2} = \frac{NI_0\lambda}{0.16a} \tag{41}$$

Using the above result in equation 39 will result in the following constraint on the available bandwidth in wavelength domain:

$$\text{Bandwidth} = \frac{0.16\lambda}{N^2 I_0} \tag{42}$$

where in equation 42, $\lambda$ is the light wavelength, N is the number of input.output ports, and $I_0$ is an integer.

To maximize the available bandwidth, we choose $I_0 = 1$, i.e.

$$2\delta = \text{Max. Bandwidth} = \frac{0.16\lambda}{N^2} \tag{43}$$

The bandwidth presented in equation 43 is the available band around the nominal central wavelength $\lambda$.

As apparent from the periodic nature of equation 11a, such a bandwidth as expressed by equation 43 is also available around all other wavelengths spaced by an integer multiple of $\Delta\lambda$ form $\lambda$ where:

$$\Delta\lambda = \frac{0.64\lambda}{N^2} \tag{44}$$

That is, any other wavelength that produces a phase shift proportional to an integer multiple of $2\pi$ inside the argument of the sine function in equation 11a has available around it an equivalent amount of 3−dB bandwidth.

For the special case of a 9×9 coupler, where N=9 and for N=16, the available maximum bandwidth is about 3 nm and 1 nm, respectively. In general, by using the number of input/output ports N, we can use equation 43 to find the maximum available band.

Such a coupler can be designed around the central wavelength $\lambda_0$ for dense wavelength division multiplexing applications. All wavelengths used around $\lambda_0$ that fall within the 3−dB band of the coupler will get through the coupler. Going back to FIG. 12, we can choose 16 wavelengths around $\lambda_0$ such that they fall within the 3−dB band of the coupler. By forming the proper holographic patterns on the photosensitive slab, the perfect shuffle connectivity can be established.

To increase the coupling capacity, one way is to cascade several couplers with mutually overlapping passbands and use wavelengths within the overlapped regions of the band as a means of connecting couplers. Hence, we can build economy-of-scale into the coupler design. Another alternative is to select the wavelengths used in the WDM network such that their values match those at the peaks of the sine function in equation 11a. Using the latter method, the coupling efficiency remains at its peak.

Figure 11:
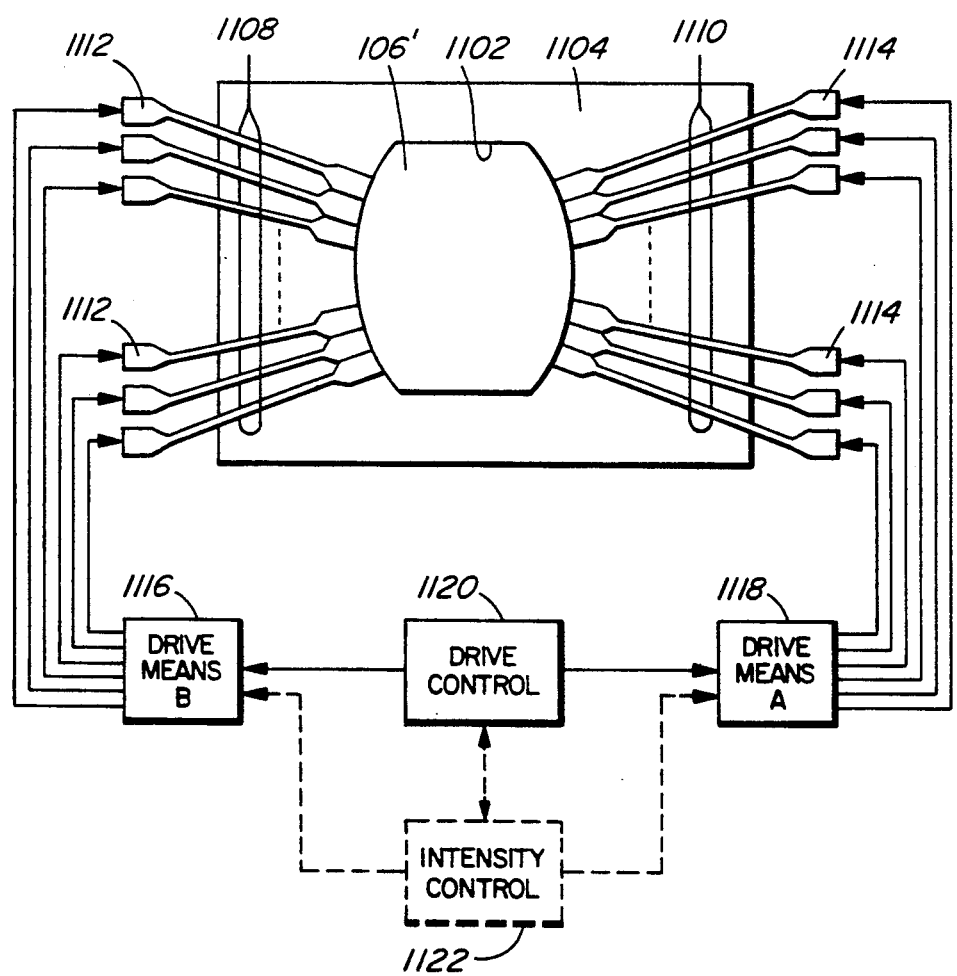
FIG. 11 is a block schematic diagram of an alternative apparatus for making a diffraction means having a spatially varying refractive index.

FIG. 11 illustrates an alternative apparatus for preparing a diffraction means with a spatially varying refractive index as described hereinbefore. The block of photorefractive material 106' is positioned in a recess 1102 in a jig 1104. The jig 1104 has a plurality of optical fibres in two arrays 1108 and 1110, respectively. These arrays of optical fibres correspond to the arrays of optical fibres 108 and 110, respectively, in the optical interconnector shown in FIG. 1. Each of the optical fibres in array 108 is connected to a respective one of a plurality of light sources 1112. The light sources may be any commercial single mode source. Likewise, each of the optical fibres in array 110 is connected to a respective one of an array of light sources 1114. Light sources 1112 are connected to drive means 1116 and light sources 1114 are connected to drive means 1118. The drive means are controlled by control means 1120 which selectively and sequentially energizes the light sources in pairs to irradiate the block 106' in order to "write" the spatially varying refractive index described with respect to FIG. 1.

As mentioned previously, with reference to the embodiment of FIG. 5, selective coupling, i.e. N is not the same as N', may be achieved simply by varying the intensity of the light sources so as to omit to write the photorefractive material at any position where no coupling is required. The embodiment of FIG. 11, can be modified to achieve this quite easily by controlling the individual light sources by way of their respective drive means 1116 and 1118. Thus intensity control means 1122 operates in conjunction with drive indexing means to vary the intensity at the appropriate positions.

The embodiments of the invention described herein are by way of example. Various modifications and alternatives may be apparent to one skilled in the art without departing from the scope of the invention which is defined by the claims appended hereto.

The coupler described as a specified embodiment has an odd number of inputs and outputs if could be modified quite readily to provide an even number of inputs and outputs, for example by omitting the 0-th mode. Moreover, although in the described embodiment the number of inputs is the same as the number of outputs, they could be different if so desired. This could be achieved quite readily by omitting to "write" the specific part of the diffraction pattern as described with reference to FIGS. 5 and 11.

We claim:

1. An optical interconnection device comprising a volume Bragg diffraction means, a first plurality (m) of optical elements spaced apart in a plane and a second plurality (m') of optical elements spaced apart in the same plane, said volume Bragg diffraction means extending in said plane between said first plurality of elements and said second plurality of elements, the first plurality of elements corresponding to diffraction orders of light beams from individual ones of said second plurality of elements and the second plurality of elements corresponding to diffraction orders of light beams from individual ones of said first plurality of elements, said diffraction means having its refractive index varying spatially according to the expression:

$$n(x,z) = 1 + \sum_m \sum_{m'} \Delta_{m,m'} \sin(\vec{K}^*_{m,m'} \cdot \vec{r})$$

where
x and z are coordinates of said plane;
$\vec{K}^*_{m,m'}$ is the spatial frequency vector;
m and m' take on integer values equal to the first plurality and second plurality, respectively;
$\Delta_{m,m'}$ is the coefficient of coupling between m and m'; and
r is the spaced vector,
the spatial frequency vector $\vec{K}^*_{m,m'}$ being determined according to the expression $$\vec{K}^*_{m,m'} = |\vec{K}^*_{m,m'}|(\vec{i}_x \cos\theta_{m,m'}, 0, \vec{i}_z \sin\theta_{m,m'})$$

where $$|\vec{K}^*_{m,m'}| = 2k\sin\frac{|m'\theta_o - m\theta_o|}{2} = k\theta_o|m' - m|$$

k is the optical wave vector and $$\theta_{m,m'} = \frac{\theta_o}{2}(m + m')$$

where $\theta_0$ is the angle between adjacent diffraction orders; and $$\frac{|\vec{K}^*_{m,m'}|^2 d}{k} > 1$$

where d is the thickness of the volume diffraction means in a direction transverse to said plane.

2. An optical interconnection device as claimed in claim 1, comprising a body having cylindrical convex opposed faces, respective cylindrical axes of faces being mutually parallel, said volume Bragg diffraction means being provided in said body such that its refractive index varies spatially and periodically in a plane substantially perpendicular to said cylindrical axes, such that a parallel light beam incident upon one of said faces of the body in said plane at a predetermined angle and with the electric field vector of such light beam extending substantially parallel to said cylindrical axes will be diffracted to provide said diffraction modes at the other of said opposed faces.

3. A device as claimed in claim 2, wherein the diffraction means is arranged to couple substantially all of the light from a said light beam to the corresponding diffraction orders.

4. A device as claimed in claim 2, wherein said optical elements comprise optical waveguides, each of said optical waveguides having an optical axis aligned with a corresponding one of said diffraction orders, such that the respective optical axes of each array converge at a position on the other of said arrays.

5. A device as claimed in claim 4, wherein said position is at the middle of said other of said arrays.

6. A device as claimed in claim 4, wherein each said optical waveguide is coupled to a source or receiver.

7. A device as claimed in claim 2, wherein the thickness of said body in the direction of the cylinder axes of said opposed faces is at least equal to the width of the light beams.

8. A device as claimed in claim 1 or 2, wherein the refractive index varies such that the said first plurality and said second plurality differ in number.

9. A device as claimed in claim 1, wherein said optical elements comprise sources and/or receivers, each of said optical elements having an optical axis aligned with a corresponding one of said diffraction orders.

10. A device as claimed in claim 1 wherein the diffraction orders comprise an equal number of orders either side of a zero order and said refractive index of the body varies spatially in accordance with the expression:

$$n(x,z) = 1 + \sum_{m=-M}^{+M} \sum_{m'=-M}^{+M} \Delta_{m,m'} \sin(\vec{K}^*_{m,m'} \cdot \vec{r}) \qquad 4$$

where x and z are coordinates of said plane;
d is the radius of curvature of the curved faces;
$\vec{K}^*_{m,m'}$ is the spatial frequency vector;
m is an input position or mode, corresponding to one optical axis;
r is the space vector; and
the total number of elements or modes (N), $= 2M + 1$.

11. A device as claimed in claim 1, wherein said optical elements comprise optical waveguides.

12. An optical interconnection device comprising diffraction means in the form of a body having cylindrical opposed faces and a refractive index which varies spatially and periodically in one plane of the body, such that a planar light beam incident upon one of said faces of the body in said plane at a predetermined angle and with the electric field of such light beam extending in the same direction as the cylindrical axes of said cylindrical opposed faces, will be refracted to emerge at a plurality of discrete angles determined by the spatially varying refractive index, such incident light being distributed substantially equally among the plurality of output refracted beams.

13. Apparatus for making a volume diffraction means for an optical interconnection device for coupling light beams between a first plurality (m) of optical elements spaced apart in a plane and a second plurality (m') spaced apart in said plane, by exposing a body of photorefractive material to radiation from a plurality of mutually coherent light sources to record resulting interference patterns such that the refractive index of the body, after exposure, will vary spatially according to the expression:

$$n(x,z) = 1 + \sum_m \sum_{m'} \Delta_{m,m'} \sin(K_{m,m'}^* , r)$$

where x and z are coordinates of said plane;
$\bar{K}^*_{m,m'}$ is the spatial frequency vector;
m and m' take on integer values equal to the first plurality and second plurality, respectively;
$\Delta_{m,m'}$ is the coefficient of coupling between m and m'; and
r is the space vector, the spatial frequency vector $\bar{K}^*_{m,m'}$ being determined according to the expression $$K_{m,m'}^* = |K_{m,m'}^*|(i_{xcos}\theta_{m,m'}, 0, i_z \sin\theta_{m,m'})$$

where $$|K_{m,m'}^*| = 2k\sin\frac{|m'\theta_o - m\theta_o|}{2} = k\theta_o|m' - m|$$

k is the optical wave vector and $$\theta_{m,m'} = \frac{\theta_o}{2}(m + m')$$

where $\theta_y$ is the angle between adjacent diffraction orders; and $$\frac{|K_{m,m'}^*|^2 d}{k} > 1$$

where d is the thickness of the volume diffraction means in a direction transverse to the common plane, the apparatus comprising at least one pair of optical elements for emitting said radiation and means for controlling said optical elements to emit radiation simultaneously and for a predetermined length of time from different pairs of predetermined positions, the positions of each pair being spaced apart in a common plane through said body, one said position corresponding to a diffraction order for a light beam from the other position of said pair.

14. Apparatus as claimed in claim 13, further comprising intensity control means for varying the intensity of said light at predetermined positions to vary said coefficient of coupling $\Delta_{m,m'}$.

15. Apparatus as claimed in claim 13, wherein a single said pair of optical elements are movable between said different pairs of predetermined positions.

16. Apparatus as claimed in claim 13, wherein said optical elements are arranged in arrays, each optical element disposed at a position corresponding to a said diffraction order, and said means for controlling is operable to effect radiation from a first pair of sources a first pair of predetermined positions to record a first interference pattern, and a second pair of said sources at a second pair of predetermined positions to record a second interference pattern.

17. Apparatus as claimed in claim 16, further comprising a support for a said body of photorefractive material said optical elements being in two coplanar arrays, one array each side of the support and with their common plane extending through said support, the elements in each array being positioned so as to emit coherent light beams, each having a planar wavefront, in respective directions extending radially of a prescribed position of an element in the other of said arrays and mutually spaced according to said diffraction orders.

18. A method of making a volume Bragg diffraction means for an optical interconnection device for coupling a first plurality of optical elements spaced apart in a plane and a second plurality of optical elements spaced apart in said plane, the first plurality of optical elements corresponding to diffraction orders of light beams from individual ones of the second plurality of optical elements and the second plurality of optical elements corresponding to diffraction orders of light beams from individual ones of the first plurality of optical elements, such that the refractive index of the body, after exposure, will vary spatial according to the expression:

$$n(x,z) = 1 + \sum_m \sum_{m'} \Delta_{m,m'} \sin(\vec{K}_{m,m'}^* \cdot \vec{r})$$

where
x and z are coordinates of said plane;
$\bar{K}^*_{m,m'}$ is the spatial frequency vector;
m and m' take on integer values equal to the first plurality and second plurality, respectively;
$\Delta_{m,m'}$ is the coefficient of coupling between m and m'; and
r is the space vector,
the spatial frequency vector $\bar{K}^*_{m,m'}$ being determined according to the expression $$\vec{K}_{m,m'}^* = |\vec{K}_{m,m'}^*|(\vec{i}_{xcos}\theta_{m,m'}, 0, \vec{i}_z \sin\theta_{m,m'})$$

where $$|\vec{K}_{m,m'}^*| = 2k\sin\frac{|m'\theta_o - m\theta_o|}{2} = k\theta_o|m' - m|$$

k is the optical wave vector and $$\theta_{m,m'} = \frac{\theta_o}{2}(m + m')$$

where $\theta_0$ is the angle between adjacent diffraction orders; and $$\frac{|\vec{K}_{m,m'}^*|^2 d}{k} > 1$$

where d is the thickness of the volume diffraction means, said method comprising the steps of:
(i) exposing a body of photorefractive material for a predetermined length of time to radiation from a pair of coherent light sources of the same wavelength, one source disposed at a first predetermined position corresponding to an element of said first plurality and the other disposed at a position corresponding to a diffraction order thereof, to record a first interference pattern; and (ii) exposing the body for a second predetermined length of time to radiation from said one source at said first predetermined position and a second source at a position corresponding to a different one of the second plurality of diffraction orders;

(iii) repeating step (ii) for each different one of the second plurality of diffraction orders;

(iv) repeating steps (i), (ii) and (iii) with said one source at positions corresponding to each of the first plurality of elements.

19. A method as claimed in claim 18, said pair of mutually coherent light sources in the first exposure step (i) and second exposure step (ii) are the same, at least one of said pair of sources being repositioned between steps (i) and (ii).

20. A method as defined in claim 18, wherein said radiation is provided by means of a first planar array of elements disposed at positions corresponding to the first array of optical elements and a second planar array of elements disposed at positions corresponding to the second plurality of optical elements, the arrays being coplanar and the body intersecting their common plane, said pair of sources comprising a source from each array, different pairs of said sources being selected sequentially for each exposure step.

21. A method as claimed in claim 20, wherein the intensity of the light from said sources is varied at predetermined positions so as to vary said refractive index to couple an incident light beam to selected ones of said diffraction orders, and where $\theta_0$ is the angle between optical axes of adjacent inputs.

* * * * *